(12) United States Patent
Garcia et al.

(10) Patent No.: US 9,633,125 B1
(45) Date of Patent: Apr. 25, 2017

(54) SYSTEM, METHOD, AND COMPUTER PROGRAM FOR ENABLING A USER TO SYNCHRONIZE, MANAGE, AND SHARE FOLDERS ACROSS A PLURALITY OF CLIENT DEVICES AND A SYNCHRONIZATION SERVER

(75) Inventors: Andrew Garcia, San Francisco, CA (US); Samir Bhupatrai Mehta, Menlo Park, CA (US); Athena Anagnostopoulos, San Mateo, CA (US); Fuad Rashid, Foster City, CA (US); Laura Susan Fried Yecies, Woodside, CA (US); Alice Viola Pintus, San Francisco, CA (US); Jason Edward Short, San Francisco, CA (US); Elie Mathias Monge, San Francisco, CA (US); James David Wong, San Jose, CA (US)

(73) Assignee: Dropbox, Inc., San Francisco, CA (US)

( * ) Notice: Subject to any disclaimer, the term of this patent is extended or adjusted under 35 U.S.C. 154(b) by 17 days.

(21) Appl. No.: 13/571,564

(22) Filed: Aug. 10, 2012

(51) Int. Cl.
*G06F 17/30* (2006.01)

(52) U.S. Cl.
CPC .............................. *G06F 17/30884* (2013.01)

(58) Field of Classification Search
USPC ....... 715/738, 733, 734, 748, 751, 234, 762, 715/810, 839, 853, 854; 707/620, 999.01, 707/E17.005, E17.032; 709/248, 203
See application file for complete search history.

(56) References Cited

U.S. PATENT DOCUMENTS

| | | | |
|---|---|---|---|
| 5,008,853 A * | 4/1991 | Bly | .................... G06F 17/30171 345/2.1 |
| 5,862,346 A | 1/1999 | Kley et al. | |
| 6,348,932 B1 | 2/2002 | Nishikawa et al. | |
| 6,407,750 B1 | 6/2002 | Gioscia et al. | |
| 6,636,873 B1 | 10/2003 | Carini et al. | |
| 6,636,888 B1 | 10/2003 | Bookspan et al. | |
| 6,904,185 B1 | 6/2005 | Wilkins et al. | |
| 7,039,723 B2 | 5/2006 | Hu et al. | |
| 7,103,357 B2 | 9/2006 | Kirani et al. | |
| 7,139,555 B2 | 11/2006 | Apfel | |
| 7,319,536 B1 | 1/2008 | Wilkins et al. | |
| 7,321,919 B2 | 1/2008 | Jacobs et al. | |
| 7,369,161 B2 | 5/2008 | Easwar et al. | |
| 7,372,485 B1 | 5/2008 | Bodnar et al. | |
| 7,441,180 B1 | 10/2008 | Kaczmarek et al. | |

(Continued)

*Primary Examiner* — Linh K Pham
*Assistant Examiner* — Wendy Nicholas
(74) *Attorney, Agent, or Firm* — Arent Fox LLP

(57) ABSTRACT

A system, method, and computer program are provided for enabling a user to synchronize, manage, and share files and folders across a plurality of client devices and a synchronization server. In a user interface, a first view displays all folders, which a user has synchronized to the synchronization server and a drop-target zone to which the user is able to drag a folder from the local device to synchronize the folder with the synchronization server. A second view displays all files and folders, which the user has shared with other users. A third view displays a list of user contacts, where each contact is a drop-target zone on which a user is able to drag a folder to share the folder with the contact. A fourth view is provided in which a user is able to see activity related to a folder displayed in the first view.

19 Claims, 26 Drawing Sheets

(56) References Cited

U.S. PATENT DOCUMENTS

| | | | |
|---|---|---|---|
| 7,502,795 B1 | 3/2009 | Svendsen et al. | |
| 7,576,752 B1 | 8/2009 | Benson et al. | |
| 7,634,533 B2* | 12/2009 | Rudolph | H04L 12/1827 |
| | | | 709/203 |
| 7,680,067 B2 | 3/2010 | Prasad et al. | |
| 7,707,500 B2 | 4/2010 | Martinez | |
| 7,747,596 B2 | 6/2010 | Bigioi et al. | |
| 7,774,326 B2 | 8/2010 | Arrouye et al. | |
| 7,809,682 B2 | 10/2010 | Paterson et al. | |
| 7,930,270 B2 | 4/2011 | Tsang | |
| 8,321,374 B2 | 11/2012 | Holt et al. | |
| 8,949,179 B2* | 2/2015 | Besen et al. | 707/610 |
| 9,069,444 B1* | 6/2015 | Hansen | G06F 3/0482 |
| 2002/0013852 A1 | 1/2002 | Janik | |
| 2002/0044159 A1 | 4/2002 | Kuroiwa et al. | |
| 2002/0059604 A1 | 5/2002 | Papagan et al. | |
| 2002/0065848 A1 | 5/2002 | Walker et al. | |
| 2002/0066050 A1 | 5/2002 | Lerman et al. | |
| 2002/0099772 A1 | 7/2002 | Deshpande et al. | |
| 2002/0129096 A1 | 9/2002 | Mansour et al. | |
| 2003/0004952 A1 | 1/2003 | Nixon et al. | |
| 2003/0014478 A1 | 1/2003 | Noble | |
| 2003/0131098 A1 | 7/2003 | Huntington et al. | |
| 2003/0159136 A1 | 8/2003 | Huang et al. | |
| 2003/0218633 A1 | 11/2003 | Mikhail et al. | |
| 2004/0024979 A1 | 2/2004 | Kaminsky et al. | |
| 2004/0044732 A1 | 3/2004 | Fushiki et al. | |
| 2004/0088420 A1 | 5/2004 | Allen et al. | |
| 2004/0148207 A1 | 7/2004 | Smith et al. | |
| 2004/0148375 A1 | 7/2004 | Levett et al. | |
| 2004/0255253 A1* | 12/2004 | Marcjan | 715/789 |
| 2005/0044164 A1 | 2/2005 | O'Farrell et al. | |
| 2005/0149481 A1* | 7/2005 | Hesselink et al. | 707/1 |
| 2005/0165869 A1 | 7/2005 | Huang et al. | |
| 2006/0020904 A1* | 1/2006 | Aaltonen | G06F 3/048 |
| | | | 715/850 |
| 2006/0052091 A1 | 3/2006 | Onyon et al. | |
| 2006/0156239 A1 | 7/2006 | Jobs et al. | |
| 2006/0161635 A1* | 7/2006 | Lamkin | G06F 17/30041 |
| | | | 709/217 |
| 2006/0242206 A1 | 10/2006 | Brezak et al. | |
| 2007/0005581 A1 | 1/2007 | Arrouye et al. | |
| 2007/0005707 A1 | 1/2007 | Teodosiu et al. | |
| 2007/0043830 A1 | 2/2007 | Housenbold et al. | |
| 2007/0156434 A1 | 7/2007 | Martin et al. | |
| 2007/0179989 A1 | 8/2007 | Maes | |
| 2007/0180075 A1 | 8/2007 | Chasman et al. | |
| 2007/0209005 A1 | 9/2007 | Shaver et al. | |
| 2007/0250645 A1 | 10/2007 | Meadows et al. | |
| 2007/0276836 A1 | 11/2007 | Chatterjee et al. | |
| 2008/0109448 A1 | 5/2008 | Aboel-Nil et al. | |
| 2008/0126936 A1 | 5/2008 | Williams | |
| 2008/0168185 A1 | 7/2008 | Robbin et al. | |
| 2008/0208870 A1* | 8/2008 | Tsang | 707/10 |
| 2008/0288301 A1* | 11/2008 | Emling et al. | 705/4 |
| 2008/0295101 A1* | 11/2008 | Vicars et al. | 718/102 |
| 2009/0094252 A1 | 4/2009 | Wong et al. | |
| 2009/0138808 A1* | 5/2009 | Moromisato | G06Q 10/10 |
| | | | 715/758 |
| 2009/0183060 A1 | 7/2009 | Heller et al. | |
| 2009/0187609 A1 | 7/2009 | Barton et al. | |
| 2009/0271708 A1* | 10/2009 | Peters | G06F 17/24 |
| | | | 715/738 |
| 2010/0063670 A1 | 3/2010 | Brzezinski et al. | |
| 2012/0096370 A1* | 4/2012 | Bell | G06F 3/0486 |
| | | | 715/748 |
| 2012/0215816 A1* | 8/2012 | Kidron | 707/803 |
| 2012/0246228 A1* | 9/2012 | Udezue | H04L 12/1859 |
| | | | 709/204 |
| 2012/0330887 A1* | 12/2012 | Young et al. | 707/610 |
| 2013/0132342 A1* | 5/2013 | Kao | 707/620 |
| 2013/0138608 A1* | 5/2013 | Smith | 707/610 |
| 2013/0205251 A1* | 8/2013 | Cisler | G06F 17/30126 |
| | | | 715/810 |
| 2013/0219049 A1* | 8/2013 | Geibel | G06F 11/3433 |
| | | | 709/224 |
| 2013/0275509 A1* | 10/2013 | Micucci et al. | 709/204 |
| 2013/0275883 A1* | 10/2013 | Bharshankar et al. | 715/753 |
| 2013/0283060 A1* | 10/2013 | Kulkarni et al. | 713/189 |
| 2014/0047349 A1 | 2/2014 | Kulkarni et al. | 715/739 |

* cited by examiner

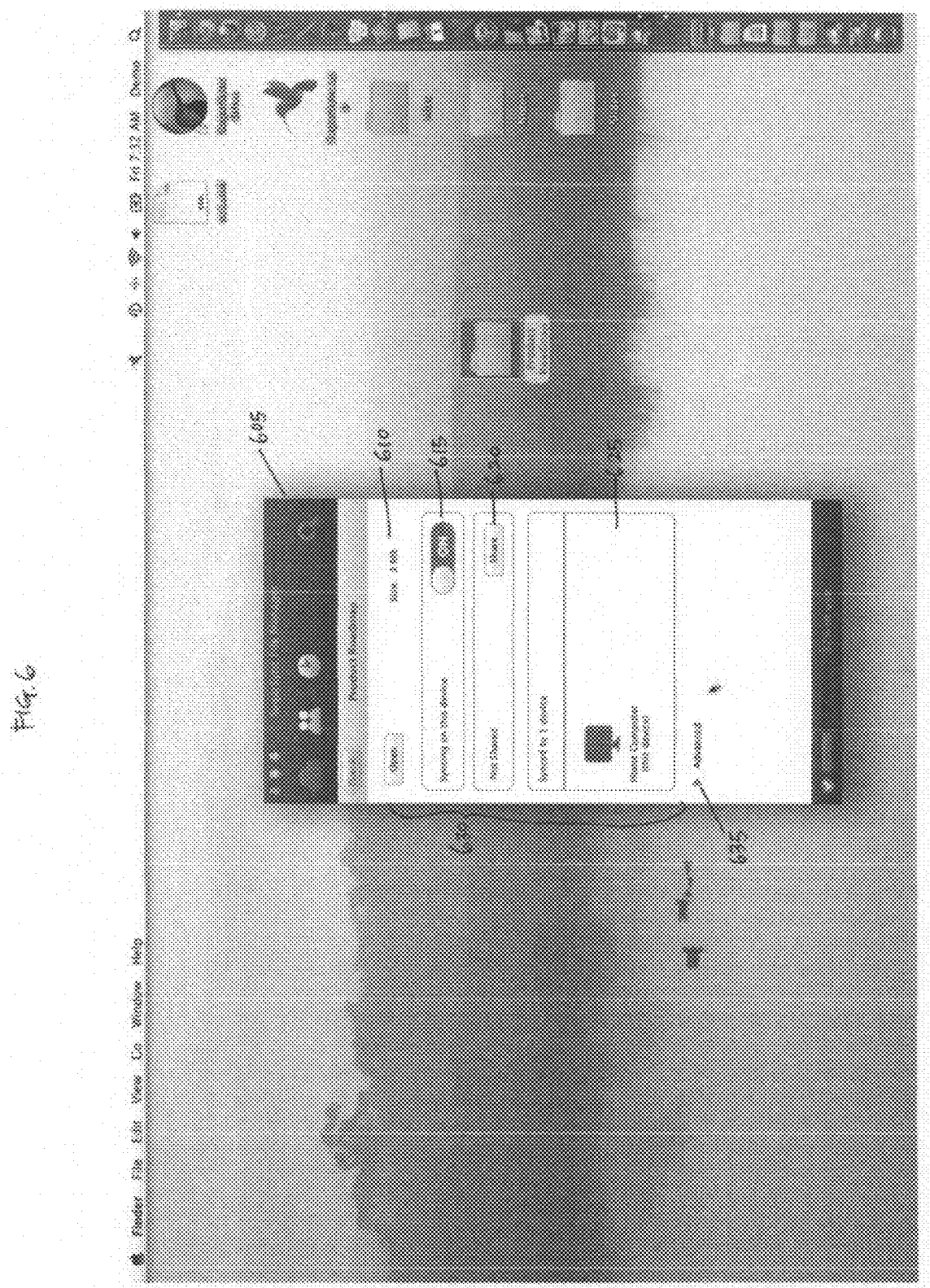

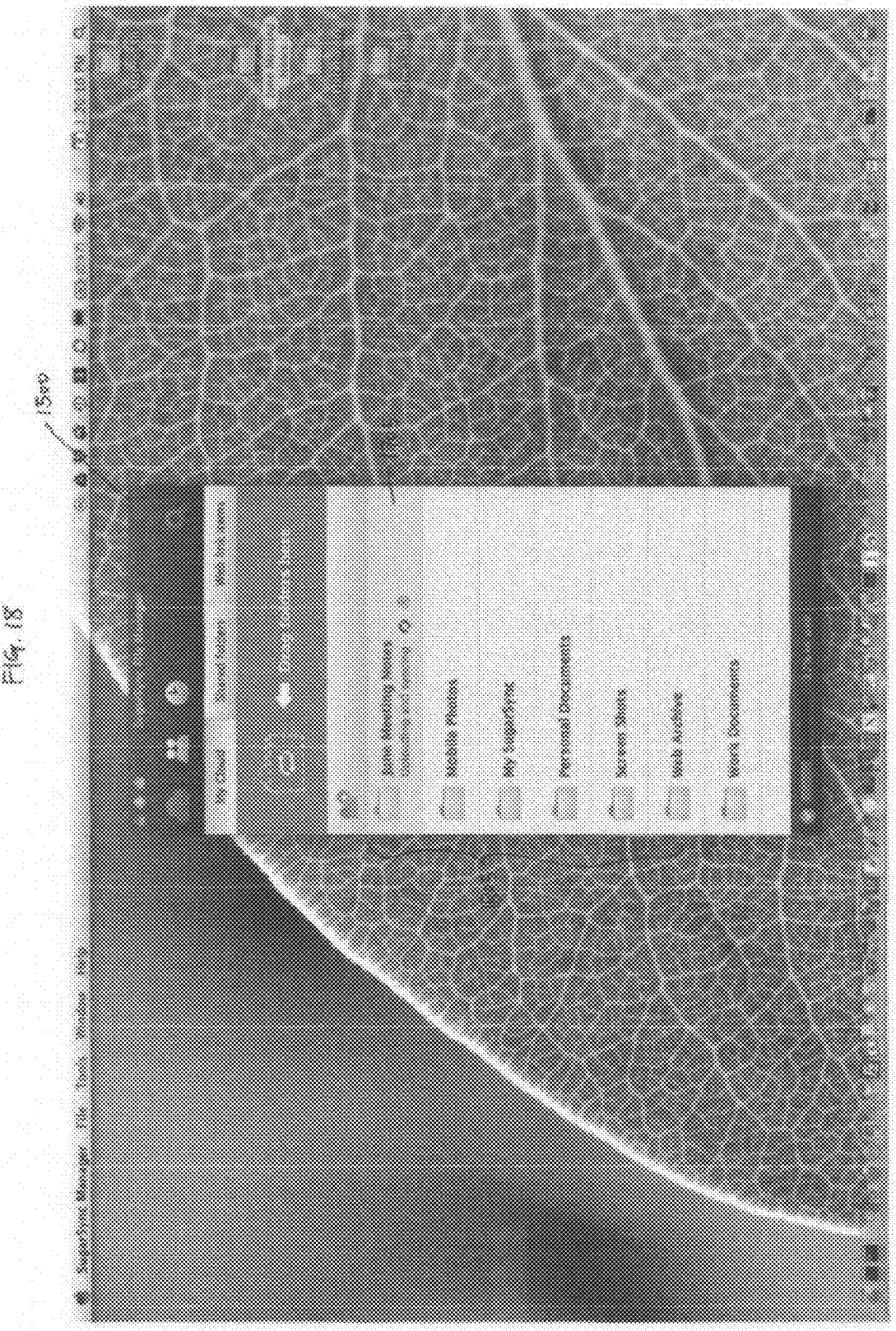

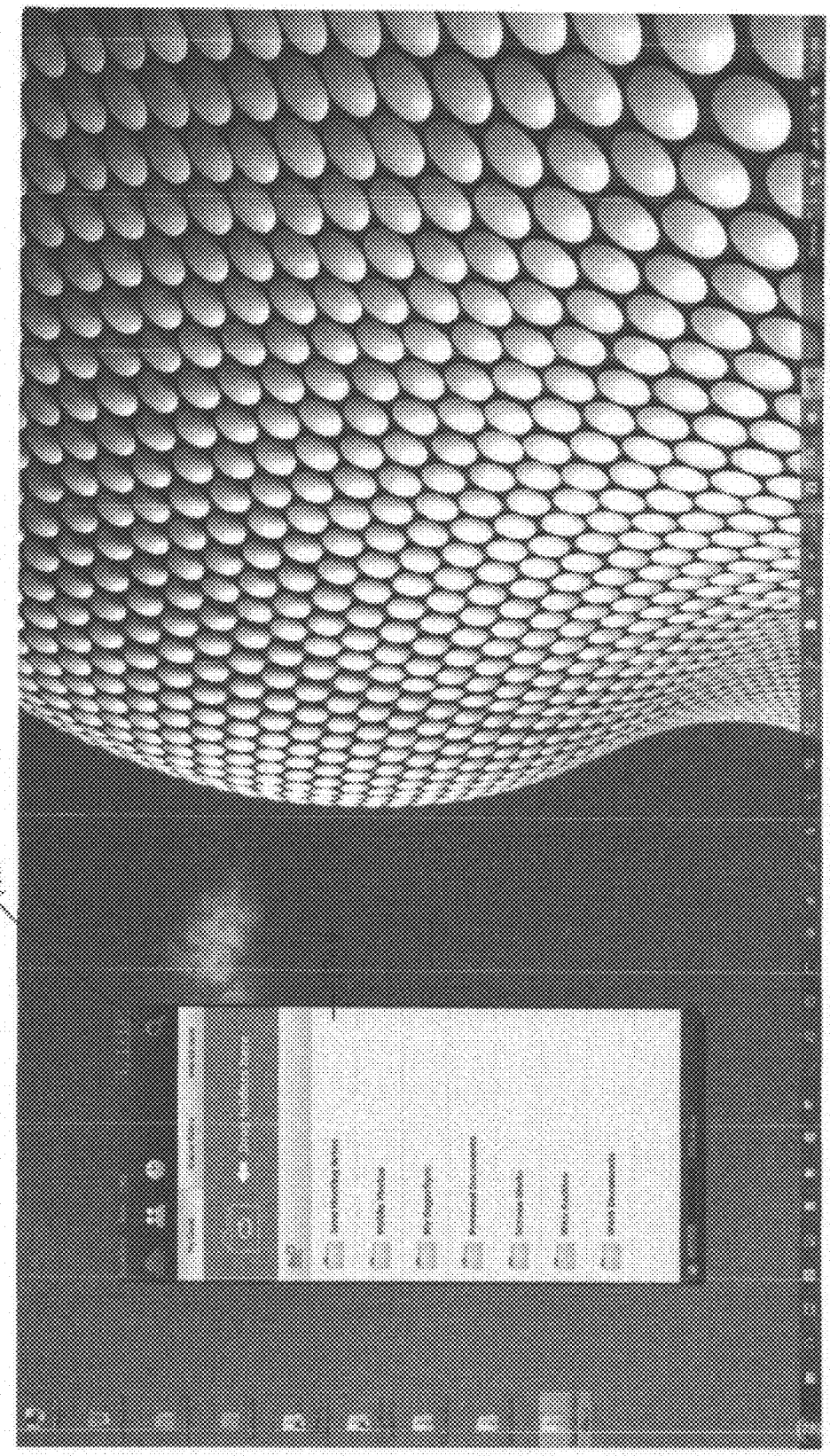

SYSTEM, METHOD, AND COMPUTER PROGRAM FOR ENABLING A USER TO SYNCHRONIZE, MANAGE, AND SHARE FOLDERS ACROSS A PLURALITY OF CLIENT DEVICES AND A SYNCHRONIZATION SERVER

BACKGROUND OF THE INVENTION

1. Field of the Invention

This invention relates generally to a synchronization system and, more particularly, to a system and method for enabling a user to synchronize, manage, and share folders across a plurality of client devices and a synchronization server.

2. Description of the Background Art

Many users have multiple computing devices, such as home computer, a work computer, and a mobile phone. Synchronization systems enable users to synchronize files on one device to another device. Some synchronization systems utilize a simple synchronization process, where a user adds any files he wishes to synchronize to a single folder, and the folder is synchronized to all of the user's devices. Other synchronization systems provide more enhanced capability and enable users to specify which folders/files will be synchronized to which devices.

The synchronization systems with the enhanced functionality have the advantage of enabling greater control and file management by the user. However, setting up and managing synchronization in these settings can also be more complex, especially for those new to the technology. Therefore, there is a need for an intuitive system and method for enabling a user to easily synchronize, manage, and share folders across a plurality of client devices in a synchronization system that provides enhanced synchronization functionality.

SUMMARY OF THE INVENTION

The present invention is directed to a system, method, and computer program for enabling a user to synchronize, manage, and share files and folders across a plurality of client devices and a synchronization server.

The method includes providing a first view in a user interface on a local device that displays all folders, across a plurality of the user's client devices (local and remote), that a user has synchronized to the synchronization server. The folders are displayed in the first view regardless of whether the folder resides on the local device or a remote device. The first view has (i) a default mode that is device independent such that, in the default mode, folders are not organized by device and (ii) a feature that enables a user to view folders by device.

A first drop-target zone is provided in the user interface to which a user is able to drag a folder from the local device to synchronize the folder between the local device and the synchronization server. In response to a user dragging a folder to the first drop target zone, a copy of the dragged folder is uploaded to the synchronization server and the dragged folder is added to the first view.

In response to a specified user command with respect to a folder in the first view, further information is displayed related to the folder, including the device(s) to which the folder is synchronized.

A user is enabled, via the user interface, to synchronize a remotely located folder to the local device. In response to a user electing to synchronize a remotely located folder to the local device, a copy of the remotely located folder is downloaded to the local device and the user interface is updated to indicate that the remotely located folder is now synchronized to the local device.

A second view is provided in the user interface that displays all folders, across a plurality of the user's client devices, that the user has shared with other users. A third view is provided in the user interface that displays a list of user contacts. Each listed contact is a drop-target zone on which a user is able to drag a folder to share the folder with the contact. A second drop-target zone is provided in the user interface on which a user is able to drag a folder to generate a dialog box that provides a user with options for sharing the folder with another person.

A fourth view is provided in the user interface in which a user is able to see activity related to a folder displayed in the first view. For folders that are shared with other users, the user is able to see activity of the other users with respect to the folders.

In certain embodiments, the method enables a user to synchronize, manage, and share objects across a plurality of client devices and a synchronization server. These objects may include files, media objects, collections, etc. Collections may include items, stored across the plurality of client devices, which share one or more specified attributes. The attributes may be specified automatically by the synchronization system or by the user. Examples of attributes that may be used to specify a collection include a location associated with an object, a version of an object, a timestamp associated with an object, file type of an object, device on which object resides, and a permission class associated with a shared object.

In one embodiment, the method further includes providing a search tool in the user interface that enables a user to search for files in any folder displayed in the user interface. A feature may also be provided in the user interface that enables a user to generate a web link to any folder, or file therein, displayed in the user interface. A user may be able to access, via the user interface, a virtual drive on the local device, where, via the virtual drive, a user is able to access items (e.g., files) in any object (e.g., folders), including objects located only on a remote device. A user may also be enabled to edit synchronization settings for a remote folder via the user interface.

In one embodiment, in response to a specified user command with respect to a folder in the second view, the names of people with whom the user has shared the folder are displayed. The second view may also display all folders that other users have shared with the user. A user may also be enabled, via the user interface, to share a folder on a remote device with another user.

BRIEF DESCRIPTION OF THE DRAWINGS

FIGS. 3-14 are screenshots of an exemplary user interface in a synchronization system according to one embodiment of the invention.

FIGS. 15-19 are screenshots of an exemplary process of synchronizing a folder in a synchronization system according to one embodiment of the invention.

DETAILED DESCRIPTION OF THE PREFERRED EMBODIMENTS

The present invention provides a system, method, and computer program for enabling a user to synchronize, manage, and share folders across a plurality of client devices and a synchronization server.

Figure 1A:
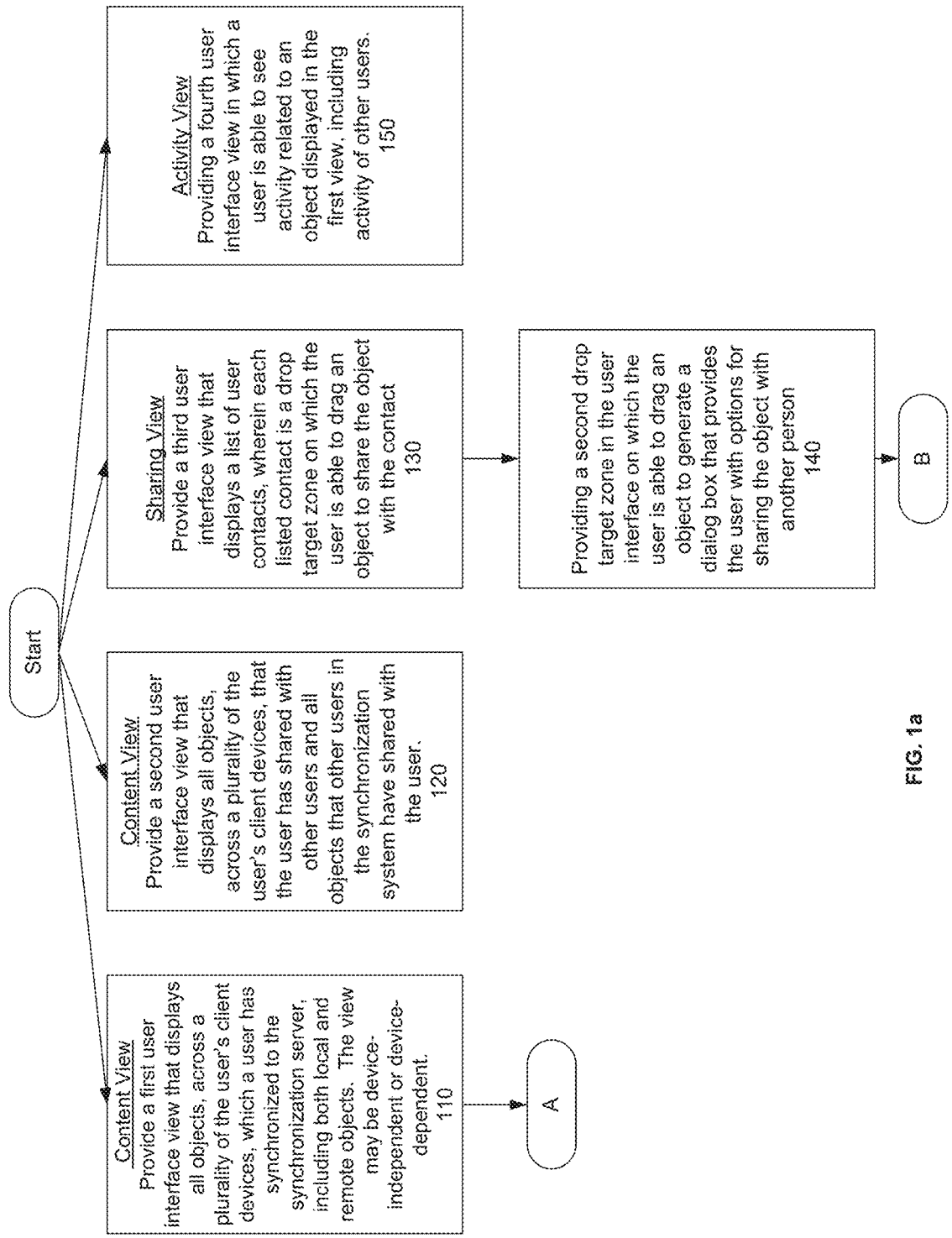
FIGS. 1*a*-1*c* are a flowchart that illustrates a method for enabling a user to synchronize, manage, and share folders across a plurality of client devices and a synchronization server.
Figure 1B:
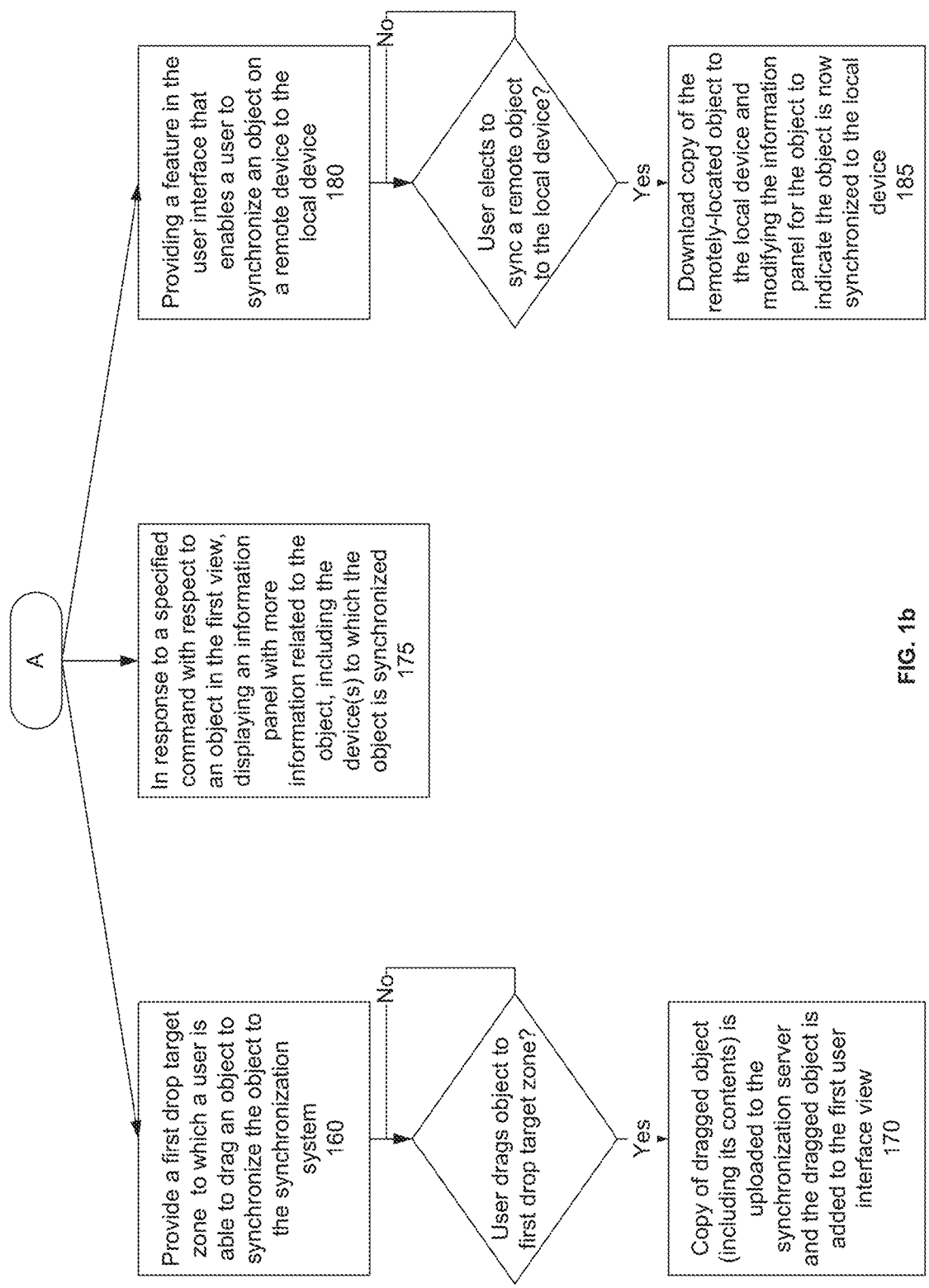
Figure 1C:
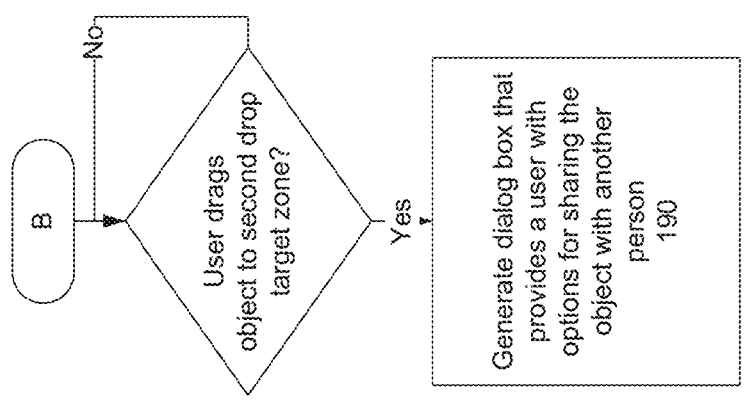

FIGS. 1a-1c show the preferred method performed on a local client device for enabling a user to synchronize, manage, and share folders across a plurality of client devices and a synchronization server. A person skilled in the art would understand that the steps of FIGS. 1a-1c may be performed in parallel and may be performed in a different order within the scope of the present invention. A client device may include a desktop computer, a laptop, a work computer, or a mobile device. In the preferred embodiment, there are three views, the content view, the sharing view, and the activity view, but a person skilled in the art would understand that there may be more or less views within the scope of the present invention.

In the content view, a first user interface view is provided on a local device that displays all objects, across a plurality of the user's client devices, which a user has synchronized to the synchronization server, including both local and remote objects (Step 110). This view is device independent such that objects are not organized by device, but the first view has filtering, sorting and grouping features that enable a user to view only those objects synchronized to a particular device. For example, a filtering feature may display only a subset of the synchronized folders. A sorting or grouping feature may display all folders, but organize and label them in groups by device. An object may be a folder or a file (e.g., a WORD document, EXCEL spreadsheet, POWERPOINT presentation, etc.), a media object (e.g., a photograph, video, etc.), or other types of files. A second user interface view is also provided that displays all objects, across a plurality of the user's client devices, which the user has shared with other users and all objects that other users in the synchronization system have shared with the user (Step 120).

In the sharing view, a third user interface view is provided that displays a list of user contacts (Step 130). Each listed contact is a drop-target zone on which the user is able to drag an object to share the object with the contact. In one embodiment, when a user drags an object to a contact in the user interface, a dialog box or other screen is generated that provides the user with options for sharing the object with the contact. For example, the dialog box may provide a user with communication options (e.g., email share invitation, use a social networking website, etc.) and permission options. A second drop-target zone also is provided in the user interface on which the user is able to drag an object to generate a dialog box that provides the user with options for sharing the object with another person (Step 140).

In the activity view, a fourth user interface view is provided in which a user is able to see activity related to an object displayed in the first view, including activity of other users (if applicable) (Step 150). For example, each time an object or an item within an object is modified, a notice is posted in the activity view.

The content view presents a number of different functions to the user. For example, the content view enables the user to synchronize an object with the synchronization system. A first drop-target zone is provided to which a user is able to drag an object to synchronize the object to the synchronization system (Step 160). The first drop-target zone may be a section of a screen within the user interface or the whole screen (e.g., the whole user interface may be a drop target zone). If the user drags an object to the first drop-target zone, a copy of the dragged object (including its contents) is uploaded to the synchronization server and the dragged object is added to the first user interface view (Step 170).

The content view also enables the user to view additional information regarding objects. For example, in response to a specified command with respect to an object in the first view (e.g., clicking on the object, "mousing" over an object, swiping the object, etc.), an information panel with more information related to the object, including the device(s) to which the object is synchronized is displayed (Step 175).

The content view also enables the user to synchronize an object on a remote device to the local device. For example, a feature, affordance, or tool in the user interface that enables a user to synchronize an object on a remote device to the local device is provided (Step 180). In one embodiment, this takes the form of an on/off toggle switch where the user can control synchronization between a remote device and a local device. In another embodiment, the user can control the synchronization settings for any object for any device. If the user elects to synchronize the remote object to the local device, a copy of the remotely located object is downloaded to the local device and the information panel is modified for the object to indicate that the object is now synchronized to the local device (Step 185).

The sharing view also presents a number of different functions to the user. For example, if the user drags an object to the second drop-target zone, a dialog box that provides a user with options for sharing the object with another person is provided.

The user interface may have additional features and functionality. In one embodiment, a search tool is provided in the user interface that enables a user to search for objects or items in any object displayed in the user interface. The search tool may search by file name or by other attributes (e.g., file type, permission class, location designation, timestamp, version, user or synchronization system defined attribute, etc.).

In another embodiment, a user is able to generate a web link in the user interface to any object displayed in the user interface. In a further embodiment, a user is able to access, via the user interface, a virtual drive on the local device, where, via the virtual drive, a user is able to access items in any object, including objects located only on a remote device.

As used herein, a virtual drive is a file system representation on the user's local client device, of data from a source that is external to the local file system. The virtual drive provides a file system representation, on the user's local client device, of all objects, across a plurality of clients including the local client, which a user has synchronized or otherwise saved to the synchronization system. In the preferred embodiment, a local sync database stores metadata about these objects, and this metadata is used to generate the virtual drive. As used herein, metadata is a collection of attributes that describe the state of an object and is used by the synchronization system to detect and orchestrate changes to the object.

Figure 20A:
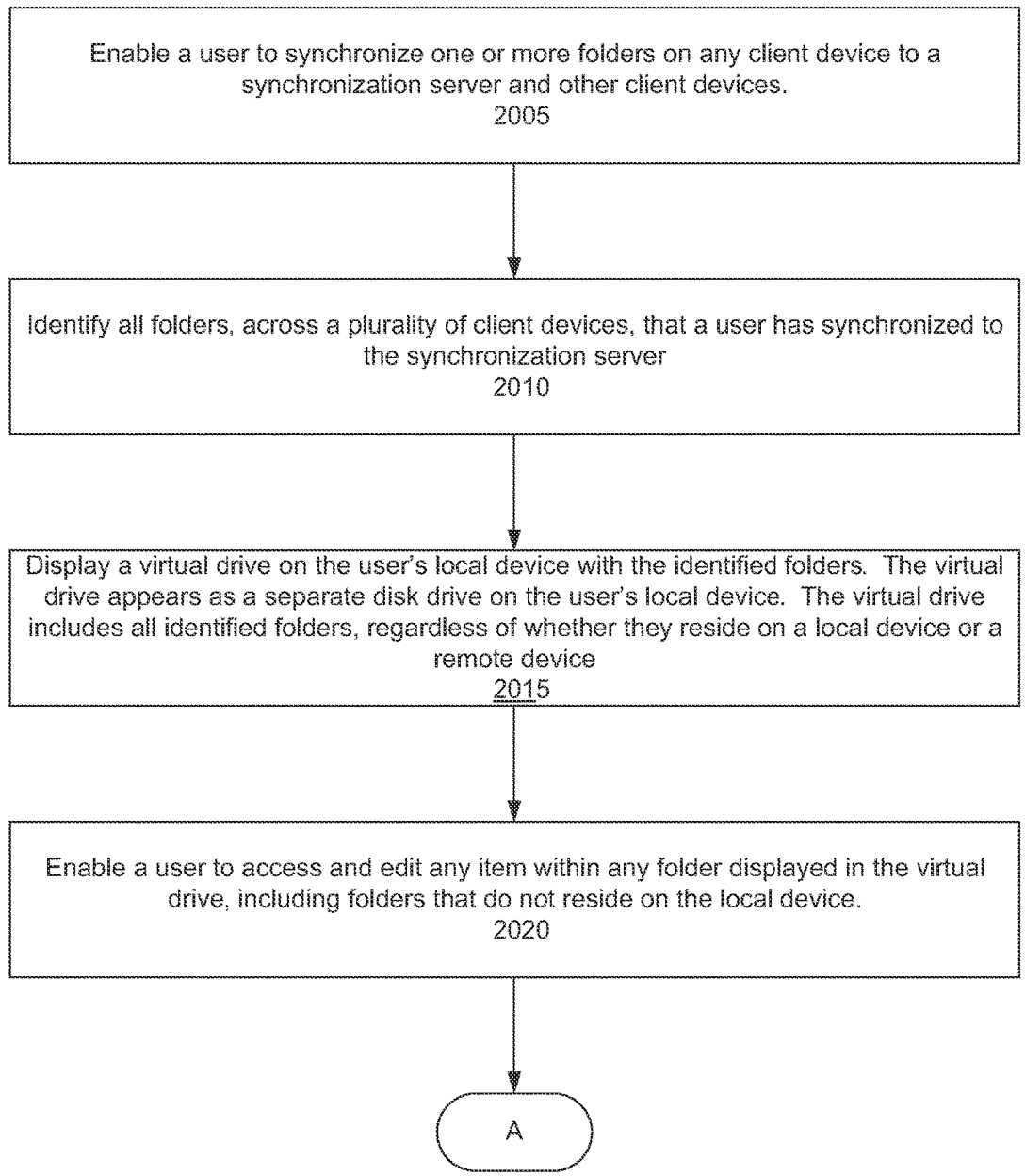
FIGS. 20*a*-20*b* are a flowchart that illustrates a method, according to one embodiment of the invention, for enabling a user to access and edit, via a virtual drive, local and remote objects, including objects synchronized to a plurality of synchronization software clients.
Figure 20B:
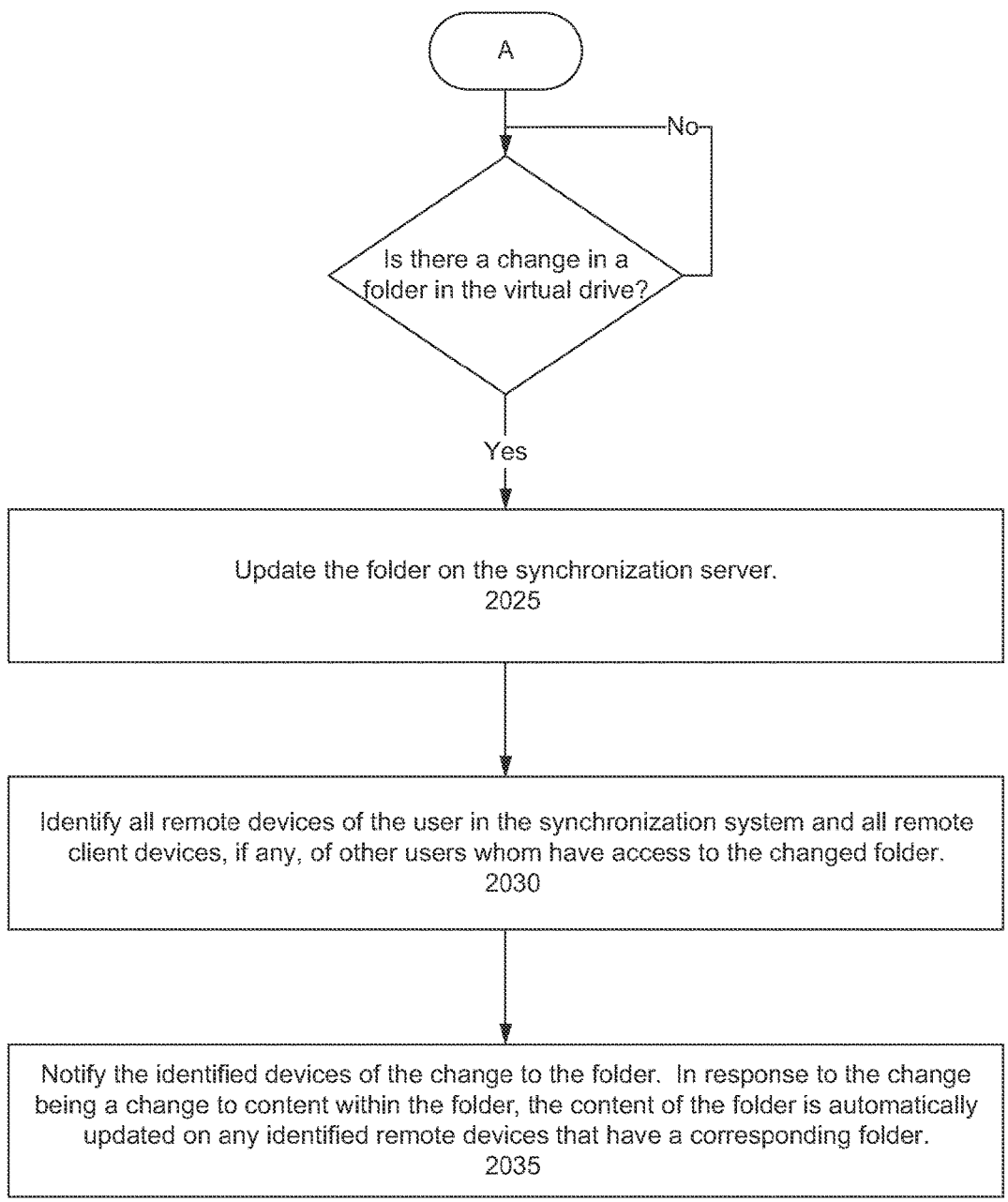

FIGS. 20a-20b illustrate a method, according to one embodiment, for enabling a user to access and edit, via a virtual drive, local and remote objects in a synchronization system, including objects synchronized to a plurality of synchronization clients. In the preferred embodiment, the objects are folders that may contain documents (e.g., EXCEL, POWERPOINT, or WORD documents), email/calendar items, video files, and/or photos, but those skilled in the art will appreciate that the method of the present invention may be applied to other objects.

Referring to FIG. 20a, a user is enabled to synchronize one or more folders on any synchronization client to the synchronization server and other synchronization clients (step 2005). All folders, across a plurality of synchronization clients that a user has backed up or synchronized to the synchronization server, are identified, as well as any folders that the user shares with other users (step 2010). Each of the synchronization clients stores metadata with information on all folders shared with or by the user and all folders that the user has backed up or synced to the synchronization server (including the contents of the folder). The synchronization client on the client device uses this metadata to generate the virtual drive and the user interface.

A virtual drive is displayed on the user's local client device with the identified folders (step 2015). The virtual drive appears as a separate disk drive on the user's local client device. The virtual drive includes all of the user's synced folders, regardless of whether a folder resides on the local client or only on a remote client. A user is enabled to access and edit any item within any folder displayed in the virtual drive, including folders that do not reside on the local client (step 2020). In one embodiment, when a user double clicks on a file or item in a remote folder in the virtual drive, the server downloads its copy of the file/item to the local synchronization software client (i.e., the client currently being used by the user). The user can then edit the file/item as desired. In one embodiment, when a user double clicks on a local folder, the user is taken to the folder in the local file system view. In another embodiment, the server downloads its copy of the item/file in the local computer.

In response to detecting a change in a folder in the virtual drive, the folder is updated on the synchronization server (step 2025). All remote clients of the user in the synchronization system are identified, as well as all remote synchronization clients, if any, of other users whom have access to the changed folder (step 2030). In one embodiment, all synchronization clients that have an interest in updates to the folder "register" for notices of changes to the folder. The identified clients are notified of the change to the folder (step 2035). In response to the change being a change to content within the folder, the content of the folder is automatically updated on any identified remote clients that have a corresponding folder. In one embodiment, the synchronization server first sends metadata to all the identified clients, notifying them of the change. The synchronization clients that have their own copy of the changed folder will then request the applicable file data from the server and the server will download the requested file data to the requesting synchronization clients.

Figure 20C:
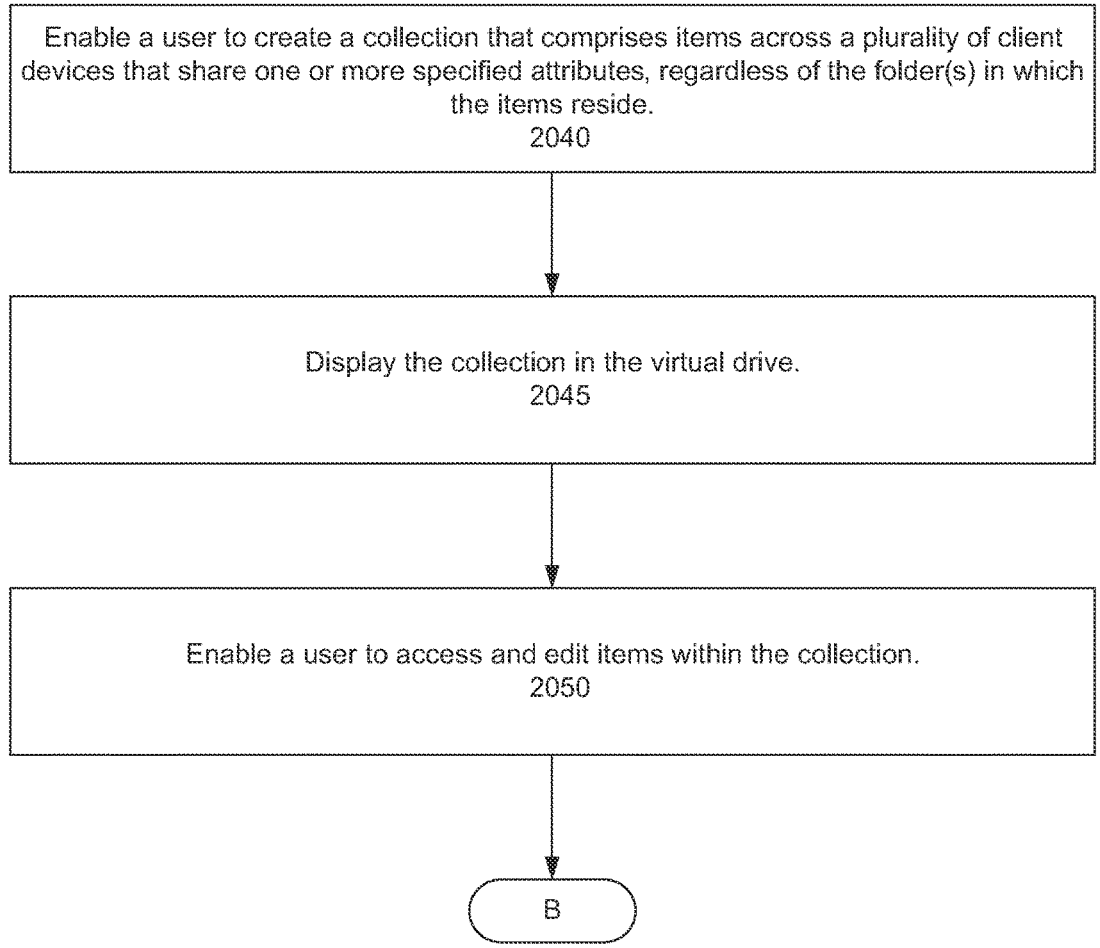
FIGS. 20c-20d are a flowchart that illustrates a further embodiment of the invention in which a user is able to view, access, and synchronize collections via a virtual drive.
Figure 20D:
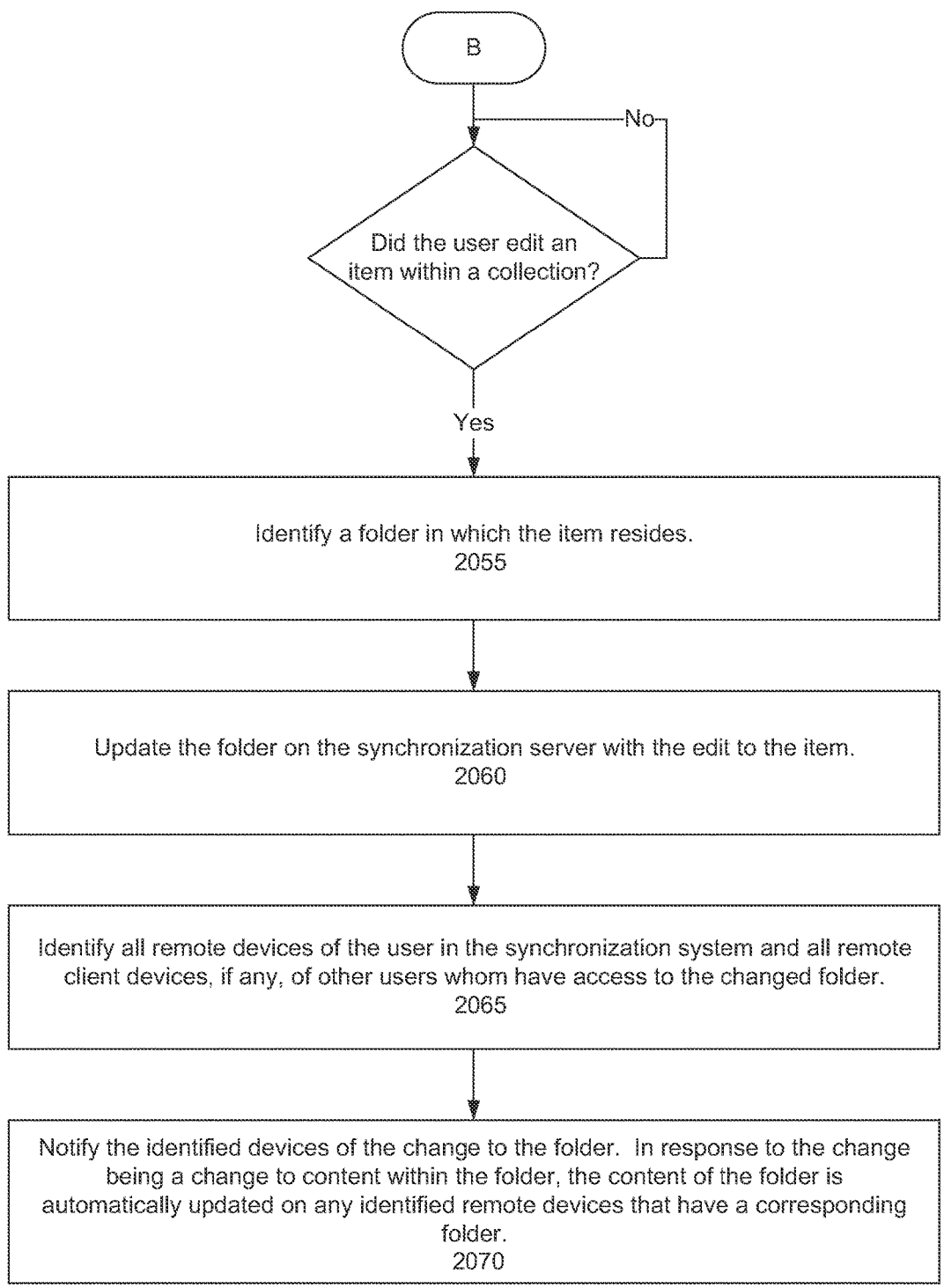

FIGS. 20c-20d illustrate a further embodiment. In this embodiment, a user is enabled to create a collection that comprises items across a plurality of synchronization clients that share one or more specified attributes, regardless of the folder(s) in which the items reside (step 2040). In certain embodiments, the collections and items within collections are not limited to files organized within folders on a file system, but are arbitrary objects existing within an arbitrary organizational scheme within an arbitrary data set.

The collection is displayed in the virtual drive (step 2045). The collection may be displayed in the virtual drive as a folder, as a file, or as an object (e.g., a node). A user is enabled to access and edit items within the collection (step 2050). In response to a user editing an item within a collection, a folder is identified in which the item resides (step 2055). The folder is updated on the synchronization server with the edit to the item (step 2060). All remote clients of the user in the synchronization system and all remote synchronization clients, if any, of other users whom have access to the changed folder are identified (step 2065). The identified clients are notified of the change to the folder (step 2070). In response to the change being a change to content within the folder, the content of the folder is automatically updated on any identified remote clients that have a corresponding folder. In the case where the items in the collection reside across an alternate organizational scheme (other than a file or folder system), the identified clients are notified of changes to any item. In response to the change being a change to content within the original physical or logical location, the content of the item is automatically updated on any identified remote clients that have a corresponding representation of the item.

The virtual drive may be organized by client device or may be client device-independent. A user may be able to perform share and synchronization management functions via the virtual drive. For example, a user may be able to right click on an object in the virtual drive to take a specific share action (e.g., share an object with another user or change the permission settings for another user with respect to the object) or alter the synchronization settings for the folder.

Figure 21:
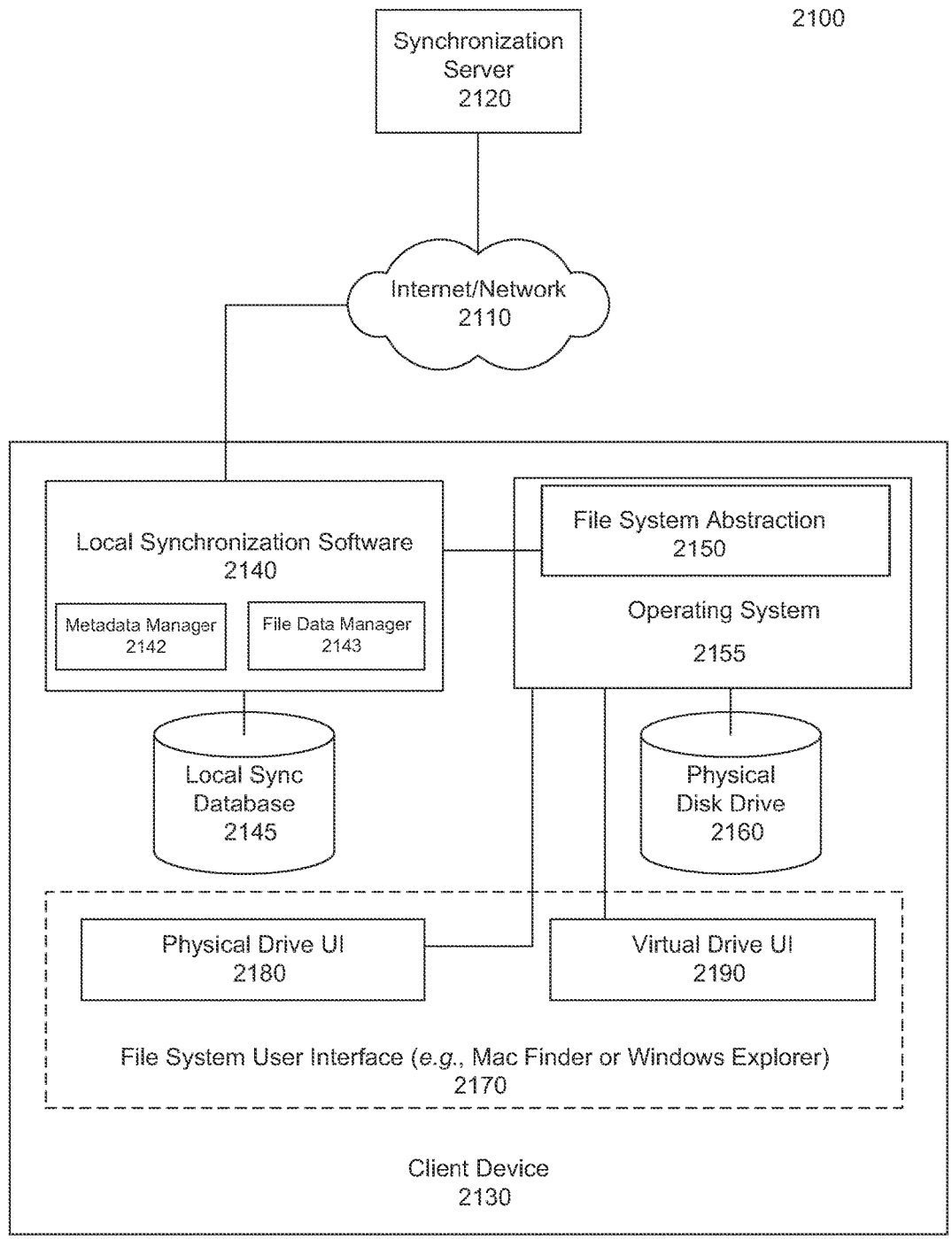
FIG. 21 is a block diagram of a synchronization system according to one embodiment of the invention.

FIG. 21 illustrates an exemplary synchronization system 2100 according to one embodiment. As a person skilled in the art would understand, the synchronization system 2100 may be constructed in any number of ways within the scope of the present invention. The methods of FIGS. 210a-210d may be implemented in other systems, and the invention is not limited to system 2100.

Synchronization system 2100 includes a synchronization server 2120, which provides synchronization and back up services to a plurality of end users. For example, all synchronized objects between a user's client devices and between users are stored on server 2120 and are accessible from any client device having access to the server 2120. Synchronization server 2120 is representative of the server-side of a synchronization system and, in a large synchronization system, is likely a plurality of synchronization servers networked together. A person skilled in the art would understand that the synchronization system 2100 may have any number of client devices, including one or more desktops, laptops, and mobile devices.

When a synchronization software client in the synchronization system detects a change to a local object, it notifies the synchronization server 2120 of the change, and synchronization server 2120 then modifies the corresponding object (and/or metadata related to the corresponding object) on the server as applicable. Server 2120 notifies the user's other synchronization clients of the change, as well as any clients of other users with access to the changed object. If the content of the object has changed and a synchronization software client has a corresponding copy of the changed object, the synchronization software client requests the applicable content data from synchronizations sever 2120.

Within client device 2130 is local synchronization client software 2140, which functions to synchronize client device 2130 with the synchronization server 2120. The local synchronization software 2140 has a metadata manager 2142 for receiving and sending change notices to and from synchronizations server 2120. The metadata manager stores metadata about objects the user has synchronized or backed up to server 2120 in the local sync database 2145. Metadata for objects other users have shared with the user is also stored in the local sync database 2145.

The local synchronization client software 2140 includes a file data manager 2143 for monitoring synchronized files (via operating system 2155) on physical disk drive 2160. Physical disk drive 2160 stores the user's local files. When a user accesses a remote file via the virtual drive, a copy of such file is temporarily stored on a local physical disk drive 2160. The file data manager 2143 informs the metadata manager 2142 if it detects a change to a synchronized object in physical disk drive 2160. The metadata manager 2142 then updates the applicable metadata in local sync database 2145 and notifies server 2120 of the change.

The local synchronization software 2140 is operatively coupled to a file system abstraction module 2150, within operating system 2155. The operating system 2155 is connected to one or more disk drives 2160. The operating system 2155 is also connected to a user interface 2170 (e.g., MAC FINDER or WINDOWS EXPLORER) which displays the physical drive user interface 2180 and the virtual drive user interface 2190. The file system abstraction module 2150 functions to process and normalize the metadata related to the synchronized objects so that the file system user interface module 2170 is able to display the virtual drive 2190.

The methods described with respect to FIGS. 20a-20d are embodied in software and performed by a computer system executing the software. A person skilled in the art would understand that a computer system has a memory or other physical, computer-readable storage medium for storing software instructions and one or more processors for executing the software instructions. The virtual drive and collections are discussed in greater detail in U.S. patent application Ser. No. 13/571,512, filed on Aug. 10, 2012, which is incorporated by reference herein in its entirety.

In some embodiments, in response to a specified command with respect to any object in the second view (e.g., clicking on an object or swiping the object), the names of people with whom the user has shared the object is displayed. All objects that other users have shared with the user may also be displayed in the second view. In certain embodiments, a user is able to share an object on a remote device with another user via the user interface on the local device. The user may also be able to edit synchronization settings for a remote object via the user interface on the local device.

As previously discussed, an object may be a folder or a file, a media object, calendar, contact, or email object, etc. The object may also be a collection. Collections comprise items, across a plurality of client devices, which share one or more specified attributes. An attribute is a property that the user can assign to any object or collection (e.g., client name). An attribute has an attribute value (i.e., the value that a user might assign to an attribute) and an attribute type (i.e., the data type of the attribute value). One example of a collection may be the user's recent photographs from Hawaii that are stored across the user's camera, mobile device, laptop, and home computer. In this example "Hawaii" is one possible value of a "location" attribute. Attributes may be specified automatically by the synchronization system or specified by the user. In one embodiment, the attributes a user may use to create a collection include, but are not limited to, a location associated with an object, an arbitrary user-defined "tag" associated with an object, a version of an object, a timestamp associated with an object, file type of an object, device on which object resides, and a permission class associated with a shared object.

Figure 2:
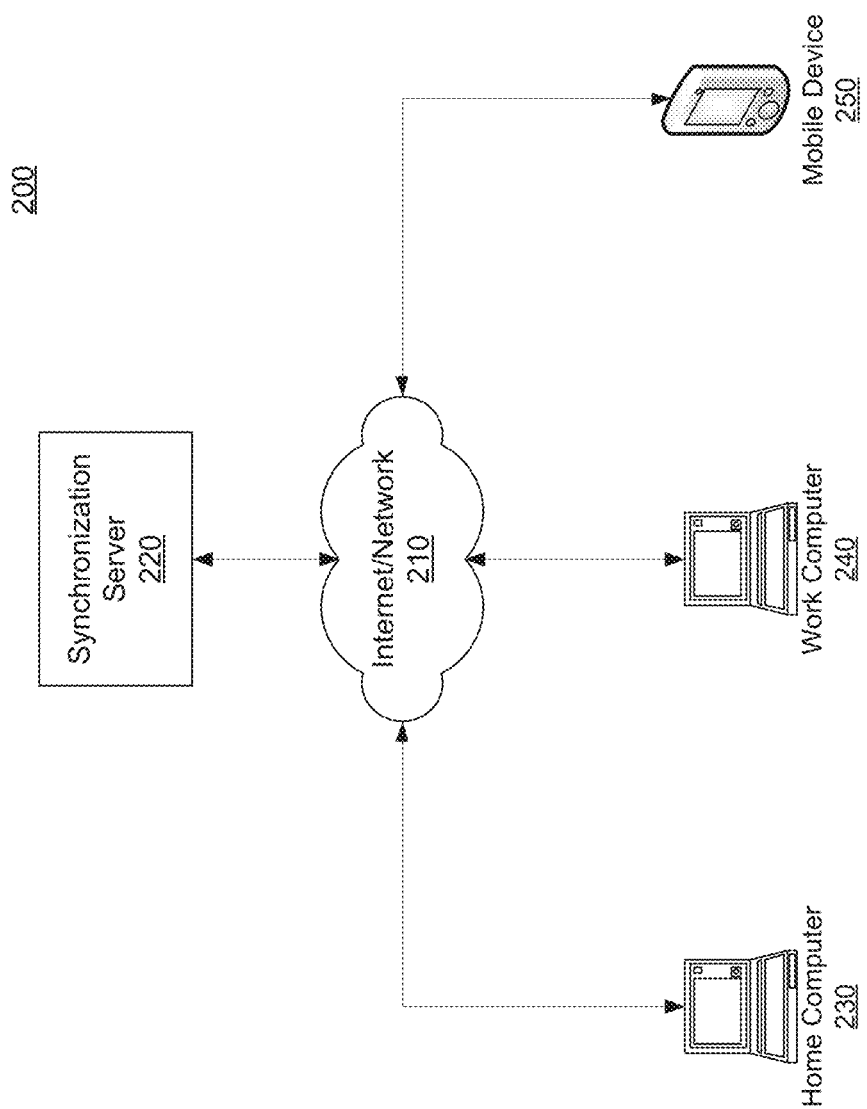
FIG. 2 is a block diagram of a synchronization system according to one embodiment of the invention.

FIG. 2 illustrates an exemplary synchronization system 200 according to one embodiment. As a person skilled in the art would understand, the synchronization system 200 may be constructed in any number of ways within the scope of the present invention. The methods of FIGS. 1a-1c may be implemented in other systems, and the invention is not limited to system 200.

Synchronization system 200 includes a synchronization server 220 and a plurality of client devices such as, for example, a home computer 230, a work computer 240, and a mobile device 250. A person skilled in the art would understand that the synchronization system 200 may have any number of client devices, including one or more desktops, laptops, and mobile devices connected to it. These client devices 230, 240, 250 may all belong to the same user or may belong to different users who have shared access to objects with one another. Client devices communicate with the synchronization server 220 via the Internet or other network 210. Synchronization server 220 is representative of the server-side of a synchronization system and, in a large synchronization system, is likely a plurality of synchronization servers networked together. When a user synchronizes an object to the synchronization server, the synchronization server stores a copy of the object.

In one embodiment, each of the client devices in the synchronization system runs a client sync application that generates the user interface described with respect to FIGS. 1a-1c. In one embodiment, the client sync application monitors multiple data sources (e.g., file systems, data associated with the synchronization system, data associated with objects being monitored by the synchronization system, etc.) on the local client devices for changes to synchronized objects and notifies server 220 of changes. When a client drags a folder to the first drop-target zone referenced in FIG. 1, the applicable client sync application notifies the synchronization server 220 and uploads a copy of the folder to the synchronization server 220. The client sync applications also register for notices of changes to relevant objects with the synchronization server. When the synchronization server receives notice of a change from a client device, it modifies its data related to the object and sends a notice of the change to all other client devices that have appropriately registered for changes to the object. Examples of synchronization systems are disclosed in (i) U.S. Pat. No. 7,885,925, titled "Method and Apparatus for File Sharing and Synchronization System," and (ii) U.S. Pat. No. 8,019,900, titled "Opportunistic Peer to Peer Synchronization in a Synchronization System." The contents of both of these patents are incorporated herein by reference as if fully disclosed herein.

The methods described with respect to FIGS. 1a-1c are embodied in software and performed by a computer system executing the software. A person skilled in the art would understand that a computer system has a memory or other physical, computer-readable storage medium for storing software instructions and one or more processors for executing the software instructions.

FIGS. 3-14 illustrate screenshots of an exemplary user interface according to the present invention. A person skilled in the art would understand that the present invention may be embodied on other user interfaces having more or less functionality within the scope of the present invention or using objects other than folders. As such, FIGS. 3-14 are intended to be illustrative and not limiting in any way.

Figure 3:
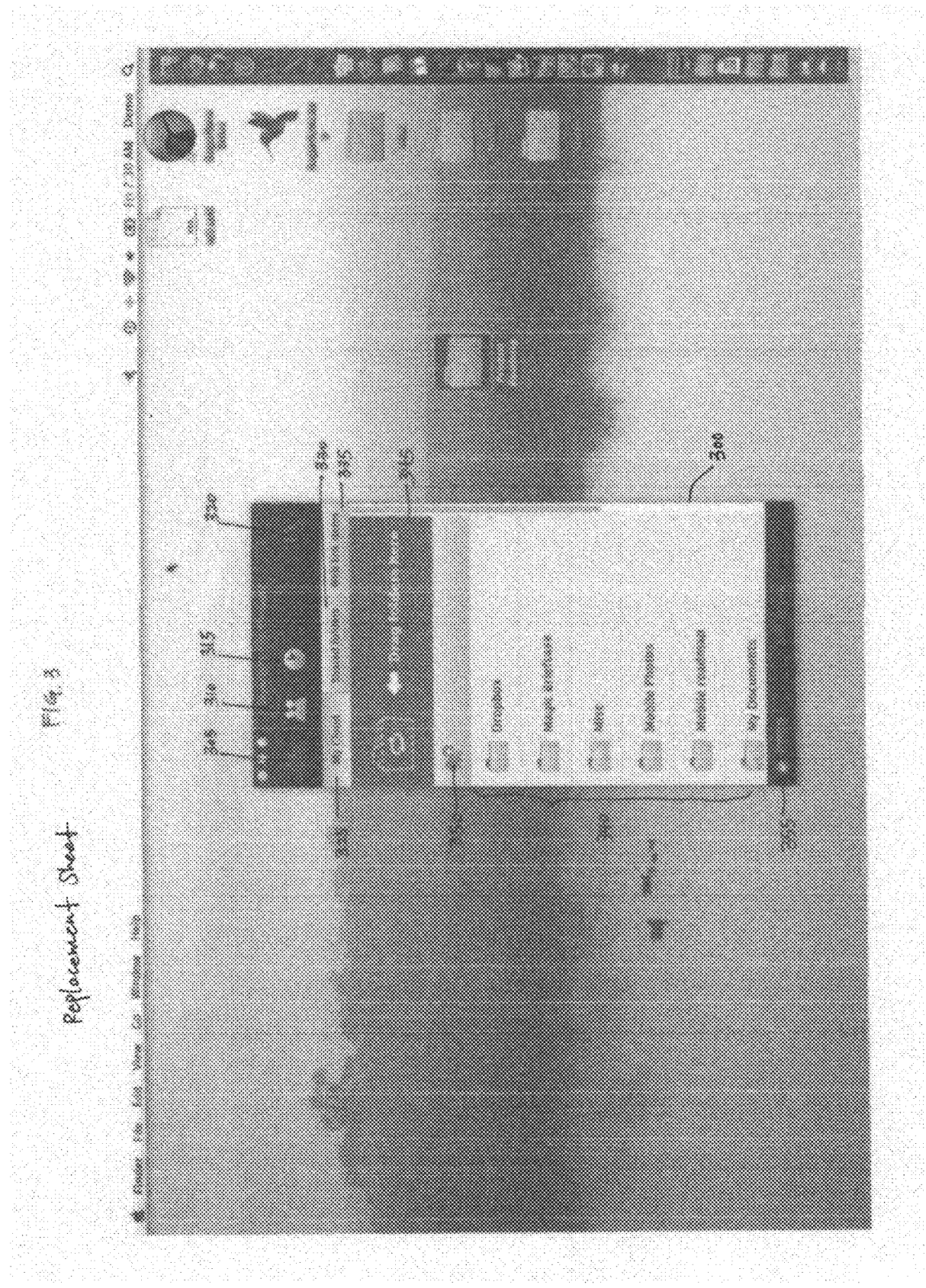

FIG. 3 illustrates an exemplary user interface 300 for a client sync application that runs on an electronic computer desktop, such as the MACINTOSH, WINDOWS or LINUX platforms. A person skilled in the art would understand that the user interface 300 also may be embodied in a web browser application or a mobile phone/tablet application. The user interface has a content view 305, a sharing view 310, an activity view 315, and a search button 320. The content button 305 has three tabs, a My Cloud tab 325, a Shared folders tab 330, and a Web link tab 335. A person skilled in the art would understand that the user interface may have more or less views and tabs within the scope of the present invention.

The My Cloud tab 325 provides a list of folders, across all the user's devices running a client sync application (e.g., home computer 230, work computer 240, and mobile device 250), that have been synchronized to or stored on the synchronization server 220. The list is not limited to folders that reside on the local device on which the user is viewing the list. The list also includes any folders on remote user devices that have been synchronized to the synchronization server. The list of folders 340 is content-centric rather than device-dependent, but the user interface may have a filter button (not shown, e.g., a drop-down menu) that would allow the user to filter out and view the folders on a particular device (e.g., home computer 230). The folders may be presented as a list, as thumbnails, etc. Also on the My Cloud tab 325 is a drop-target zone 345, to which a user can drag a folder to synchronize the folder between the local client device and the synchronization server (and, if desired, other client devices). In certain embodiments, a user may drag a remotely-located folder from the list of folders 340 on the user interface 300 to the device's desktop (e.g., home computer 230) to synchronize the folder to the local device. The drop-target zone 345 may be a section of the user interface or the entire user interface. The user may also add folders by clicking an icon 350 and browsing through the device's file system for the particular folder. The user interface may also have an indicator 355 that shows the percentage of allocated storage on the synchronization server 220 currently in use.

Figure 4:
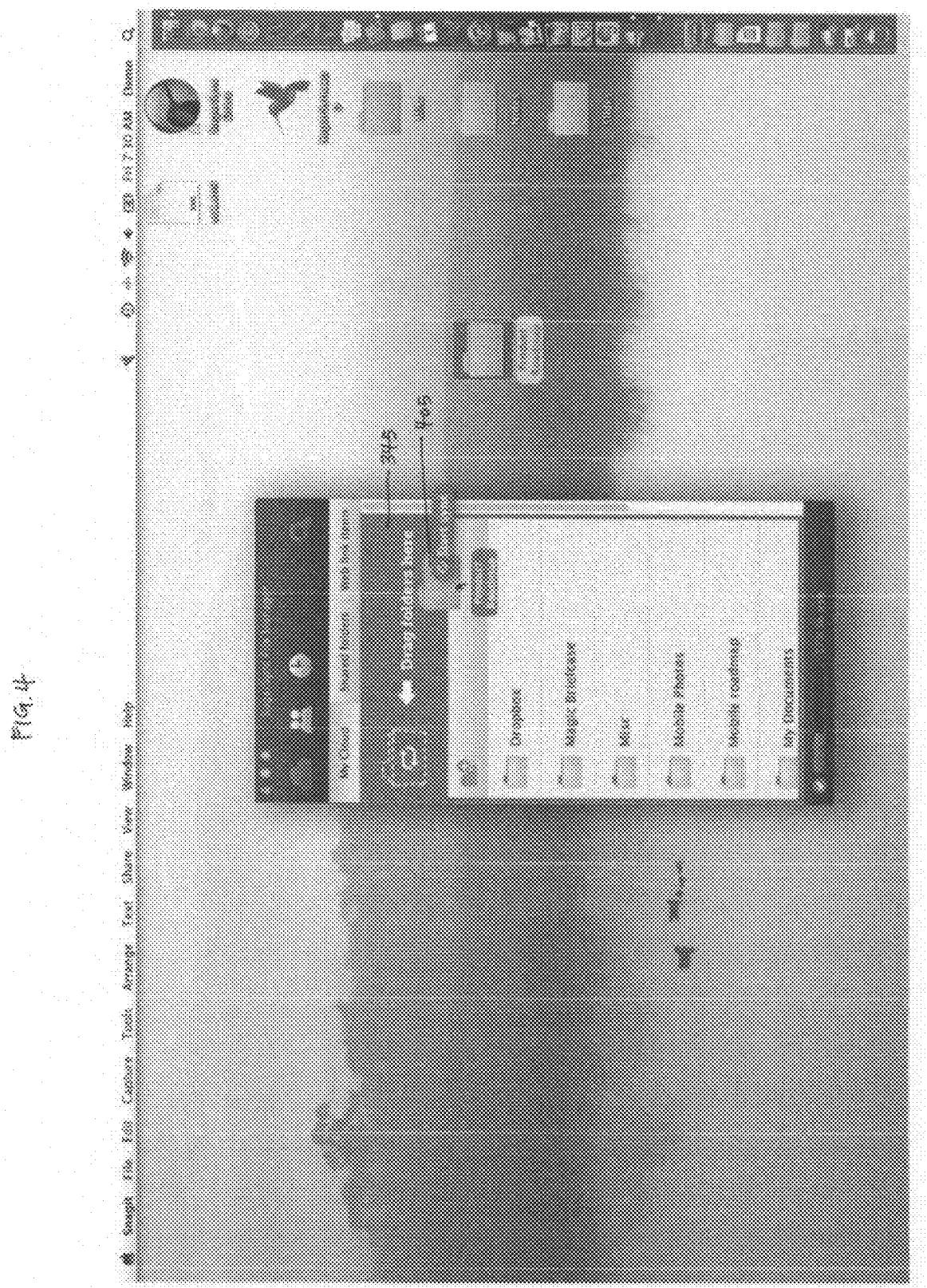

FIG. 4 illustrates the user dragging folder 405 to drop-target zone 345 on home computer 230. FIG. 5 illustrates folder 405 being uploaded to the synchronization server 220 and added to the list of folders 340. As denoted by the icon 505, the folder 405 is being synchronized with the synchronization server 220. It may also be pushed to any number of client devices (e.g., work computer 240 and/or mobile device 250) that have registered with the synchronization sever for notices of the change. Icon 510 allows the user to cancel the uploading and synchronization process.

Figure 6:
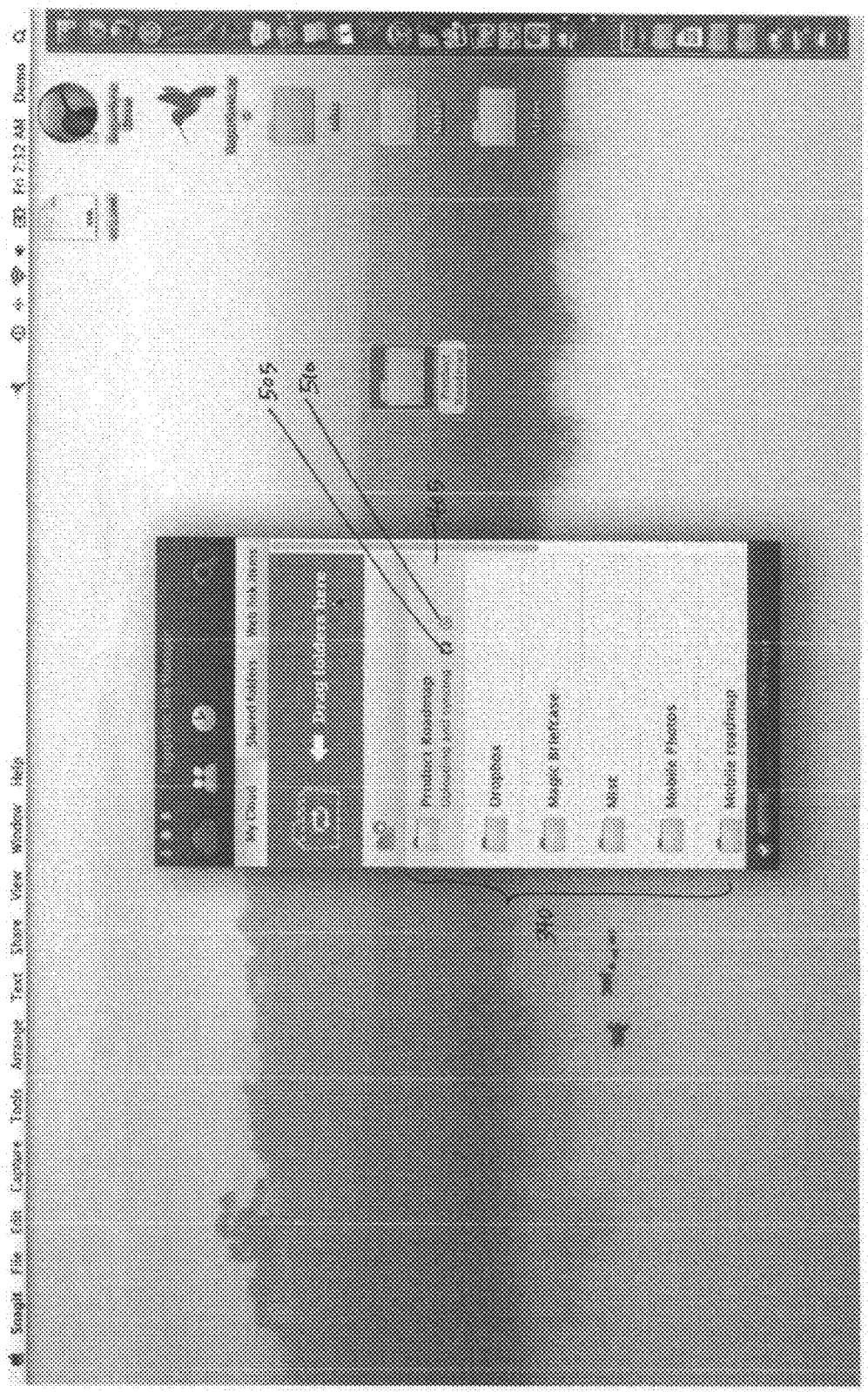

FIG. 6 illustrates the information panel 605 that the user may view after the user performs a specified command (e.g., clicks on a particular folder in the list of folders 340). The information panel 605 shows the size of the folder 610, a toggle button 615, which allows to turn on an off synchronization of the folder to the local device, a field 620 that allows user control of the sharing functionality, and a field 625 that shows which of the user's devices are synchronized with the folder.

In certain embodiments, a user may elect to synchronize a remotely located folder (e.g., on work computer 240) to the local device (e.g., home computer 230). In the example user interface, a user could do this by turning toggle switch 615 to ON for a remotely-located folder. In which case, a copy of the remotely located folder is downloaded to the local device and the information panel 605 is updated to indicate that the remotely located folder is now synchronized to the local device. A person skilled in the art would understand that more or less functionality may be present on the information panel 605 within the scope of the present invention. The information panel 605 may also be broken up into a basic section 630 and an advance section 635, which is initially hidden, but may be selected and expanded by the user. The advanced section 635 may include functionality such as controlling the synchronization of subfolders and deletion of the folder from the synchronization system.

Figure 7:
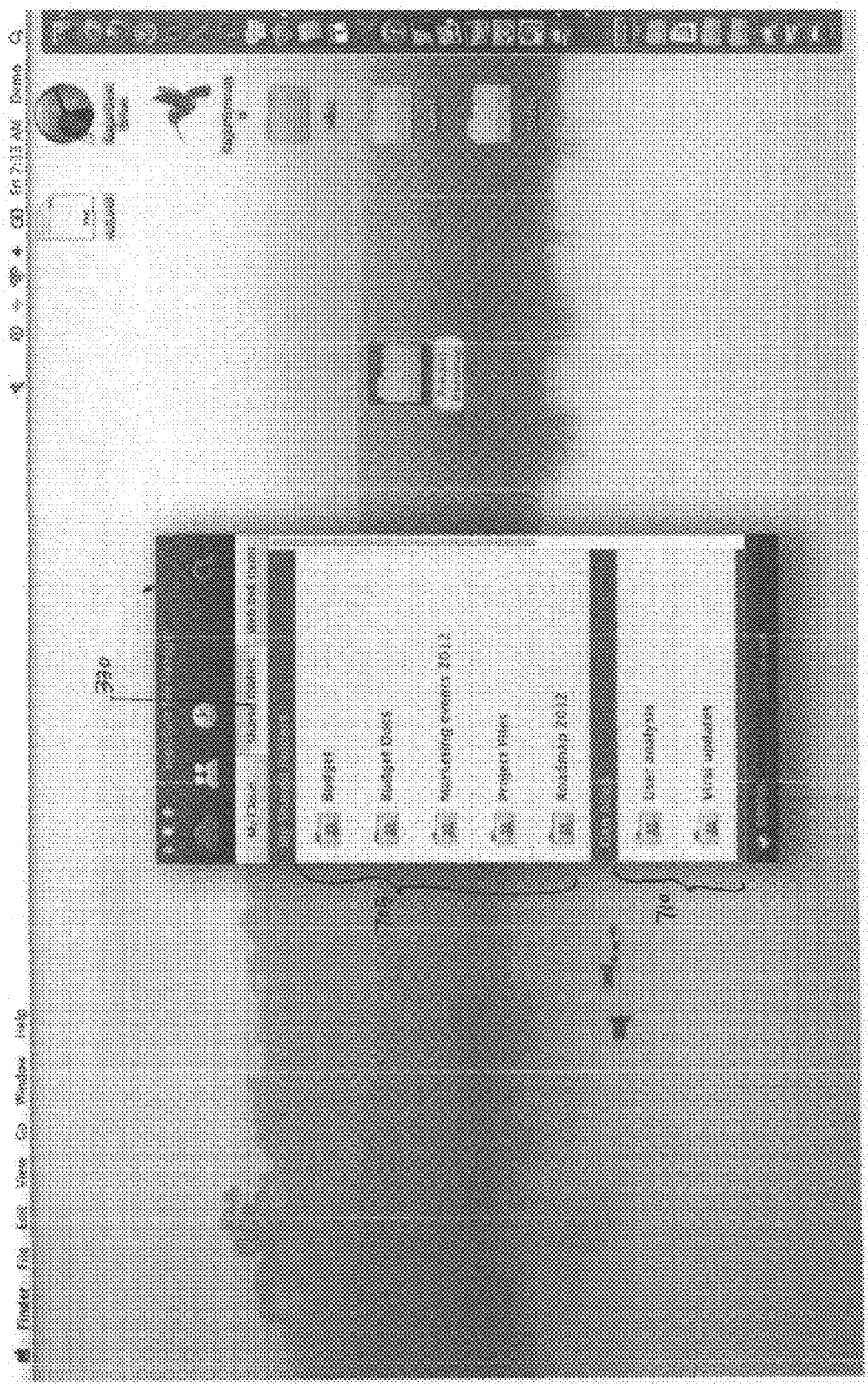
Figure 8:
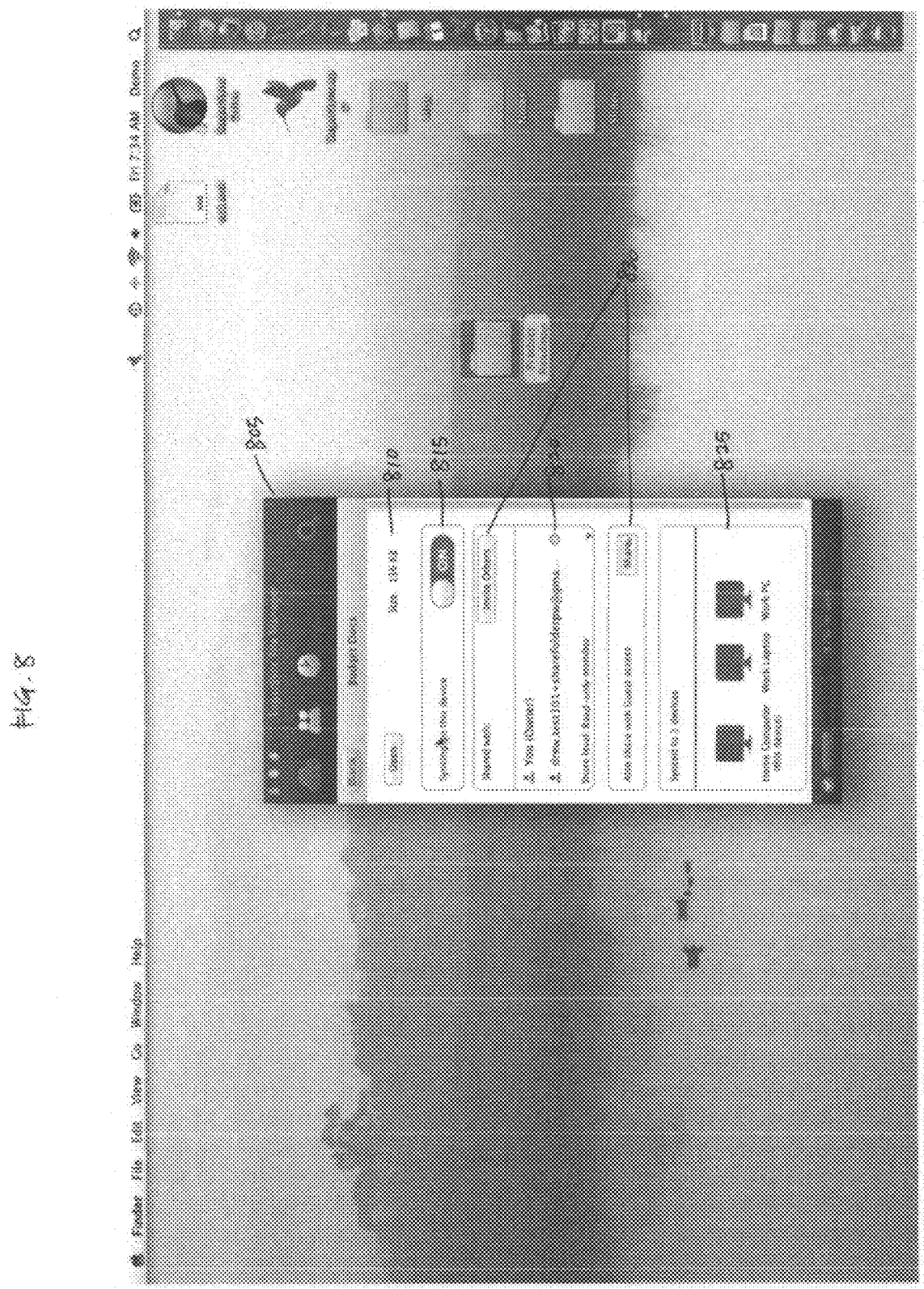

FIG. 7 illustrates the Shared folders tab 330. In the first section 705, the user views which folders the user has shared with other users. In the second section 710, the user views which folders other users have shared with him or her. FIG. 8 illustrates the information panel 805 that the user views when the user clicks on one of the folders that the user has shared with other users. The information panel 805 shows the size of the shared folder 810, whether the folder is synchronized with the local device 815, who has received a sharing invitation to the folder 820, including the sharing permission class of the other users (e.g., read-only member, etc.), and what other devices maintain synchronization with the folder 825. The information panel 805 also includes controls 830 that allow the user to share the folder with additional members or change the permission class of shared members. The user may also edit synchronization settings for a remote folder (e.g., on work computer 240) or share a folder on a remote device with another user.

Figure 9:
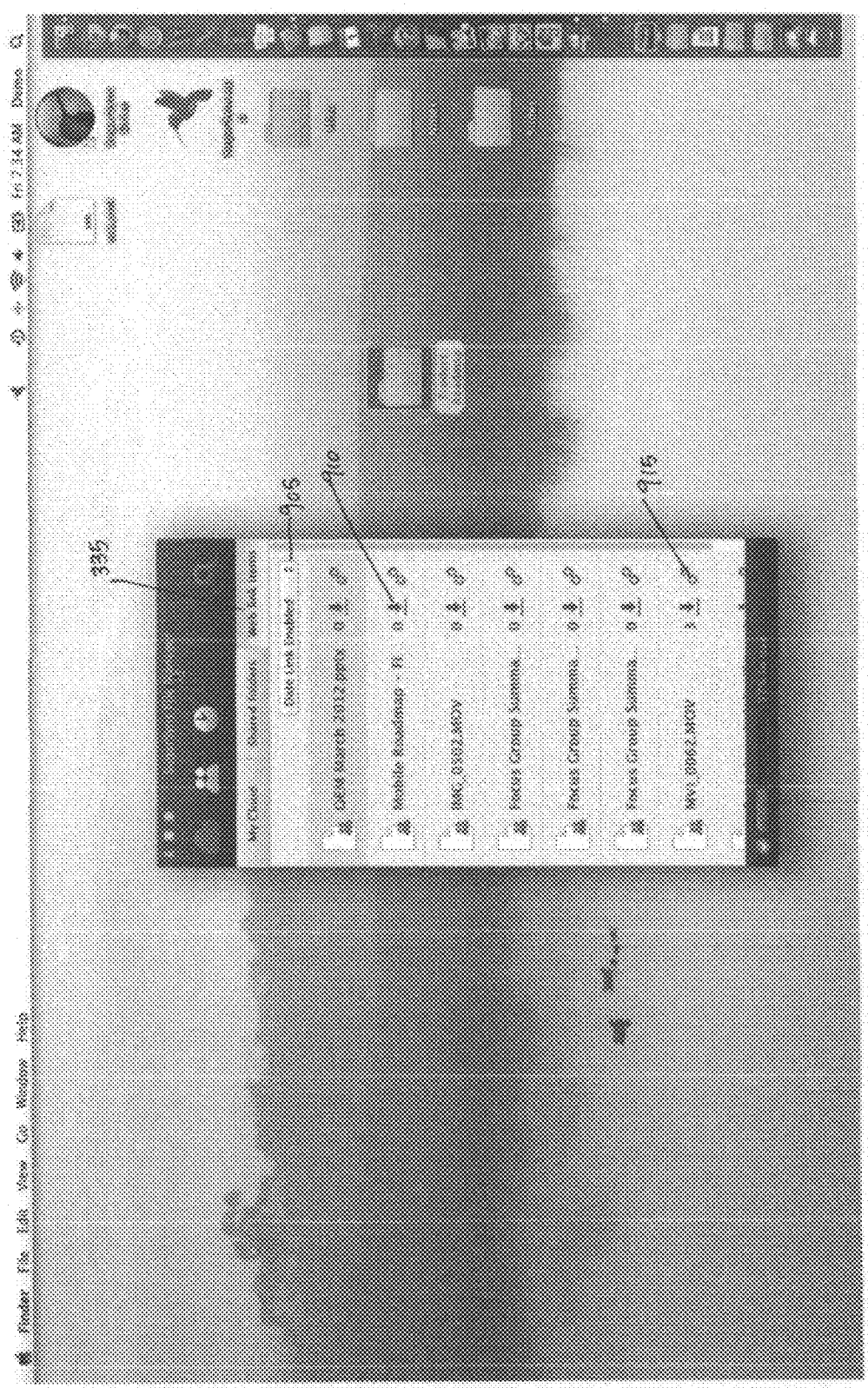

FIG. 9 illustrates the Web link tab 335. The Web link tab 335 includes a list of folders or files that have been shared as a link with other users. In this example, a list of files is shown, which is sorted by the date the link was enabled 905. The list may be sorted using other criteria as well. Each file has an icon 910, which indicates the number of times the file has been downloaded, and an icon 915, which places the link onto the clipboard to be copied into an email, text, or other transmittal. One benefit of sending links to folders or files to other users is it allows other users to access the folders or files without requiring the other user to create an account in the synchronization system.

In certain embodiments, the activity view 315 (not shown) shows a feed of all the activity or history that has taken place in the account related to any folders displayed in the My Cloud tab 325, including the activity of other users, if any, with whom the folder is shared. In certain embodiments, the search button 320 enables the user to search for files in any folder displayed in the user interface, including remote files.

Figure 10:
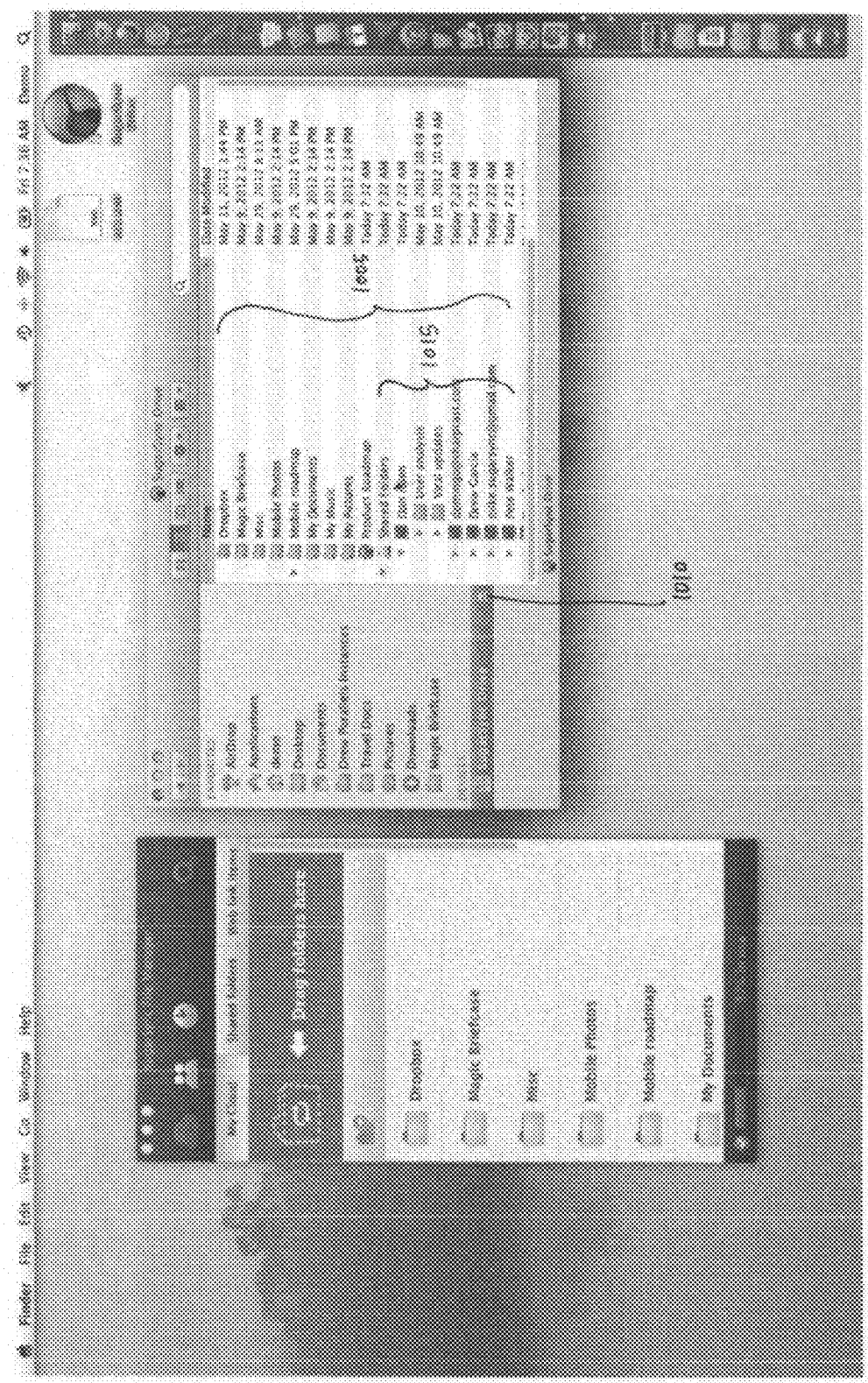

FIG. 10 illustrates one way in which a user may access items in objects displayed in the client sync application. In this particular example, the items are files and the objects are folders, but as discussed in more detail in U.S. patent application Ser. No. 13/571,512, filed on Aug. 10, 2012, which is incorporated by reference herein, items may not necessarily reside across a file or folder system, but also across an alternate organizational scheme. As seen in FIG. 10, any file in folders 1005 in the synchronization system may be accessed through a virtual drive 1010, including folders located only on a remote device (e.g., work computer 240) or folders located only on the synchronization server 220. A virtual drive is a file representation view of non-file system data. That means that the folders 1005 may be viewed as if they resided on the hard drive of the local device (e.g., home computer 230) and the user may open, add, edit, delete, and move files within these folders, including files that reside on a remote device. Changes made via the virtual drive are automatically synchronized with the synchronization server and applicable client devices. In one embodiment, a user double clicks on a folder in the user interface of the client sync application, and the virtual drive is displayed. Not only are all of the user's folders that have been synchronized to or stored on server 220 accessible through the virtual drive, but also all of the folders 1015 shared with the user by other users.

Figure 11:
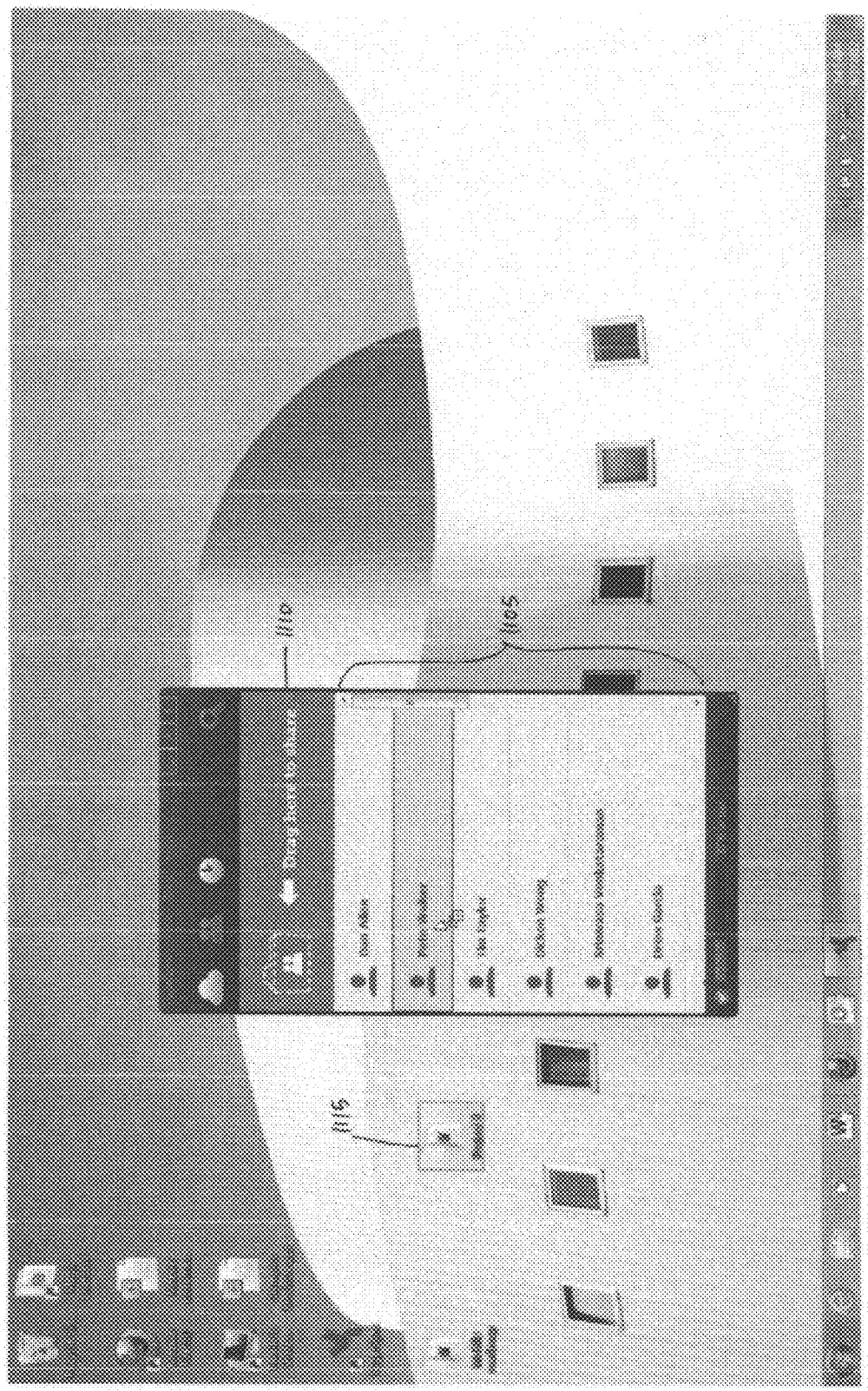
Figure 12:
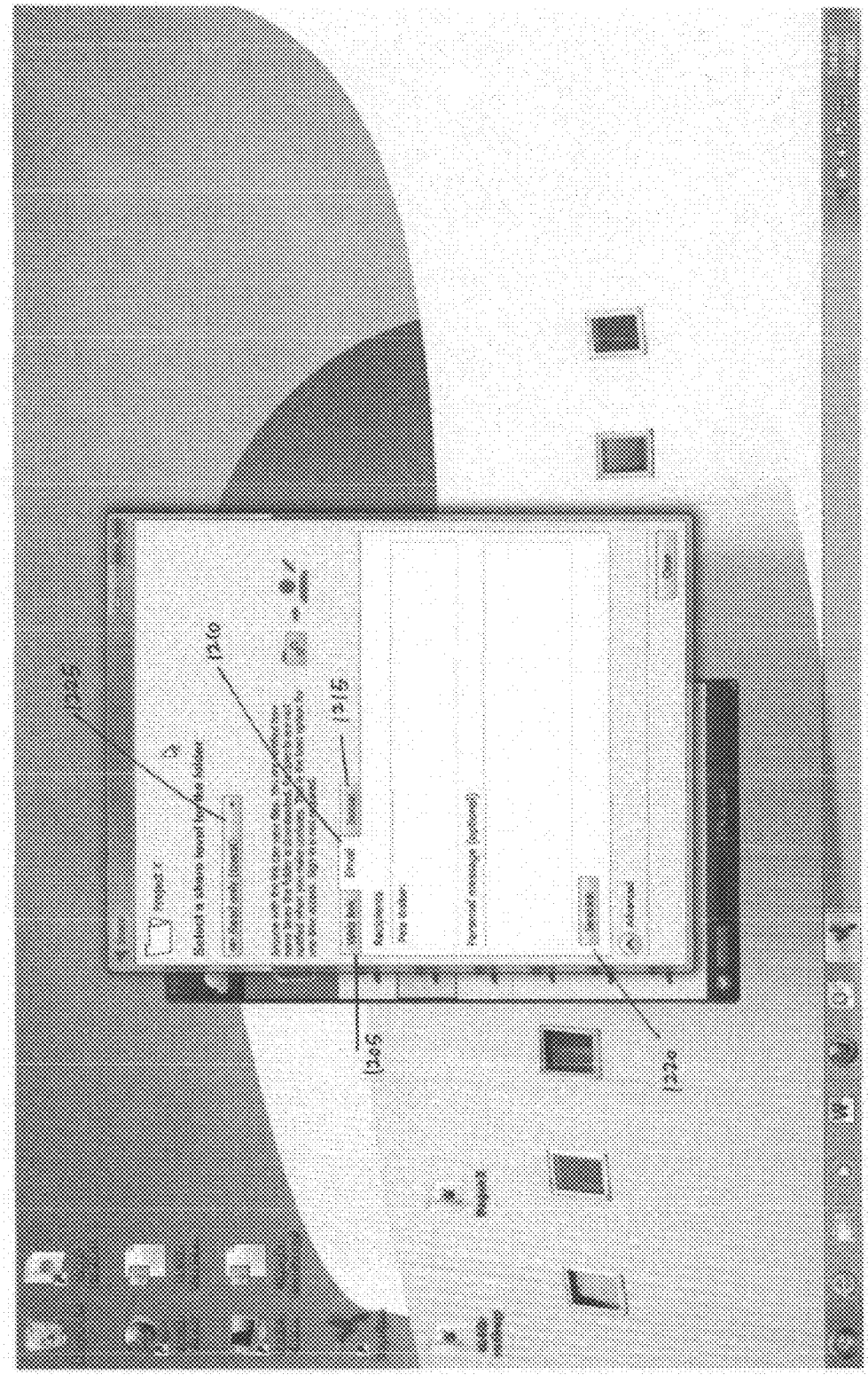

FIGS. 11-12 illustrate the functionality of the sharing view 310. FIG. 11 has a list of contacts 1105, each of which is a drop-target zone, and a separate dedicated drop-target zone 1110. The list of contacts 1105 may be compiled from the user's MICROSOFT OUTLOOK contacts, mobile device contacts, or any other contacts. In one embodiment, when a user drags a folder to a particular contact, the folder or a link to the folder 1115 is automatically sent (via email, text, or other means) to the contact. In the preferred embodiment, when the user drags a folder 1115 to a particular contact in the contact list, a dialog box is automatically displayed that provides a user with options for sharing the folder with the contact. An example of such a dialog box is shown in FIG. 12. In the illustrated example, sharing the folder 1115 may be by web link 1205, by email 1210, or by social networking 1215. The user contact information is automatically populated into the "Recipients" field. When the user clicks on the send link button 1220, a link to folder 1115 is sent to the contact. When the contact clicks on the link to folder 1115, the contents of the folder are shared with the contact. The user can control the sharing level 1225 of the folder being sent to the contact (e.g., add and edit access or read-only access). The user may also create groups of contacts and share folders with a designated group(s).

In an alternate embodiment, if the user desires to share the folder 1115 with a contact not on the contact list 1105, the user drags the folder 1115 to the separate dedicated drop-target zone 1110, and a dialog box is generated that provides the user with share options. The user may then type in the contact's information (e.g., email address) in to the applicable field in the dialog box, and a link will be sent to the contact via web link 1205, email 1210, or by social networking 1215.

Figure 13:
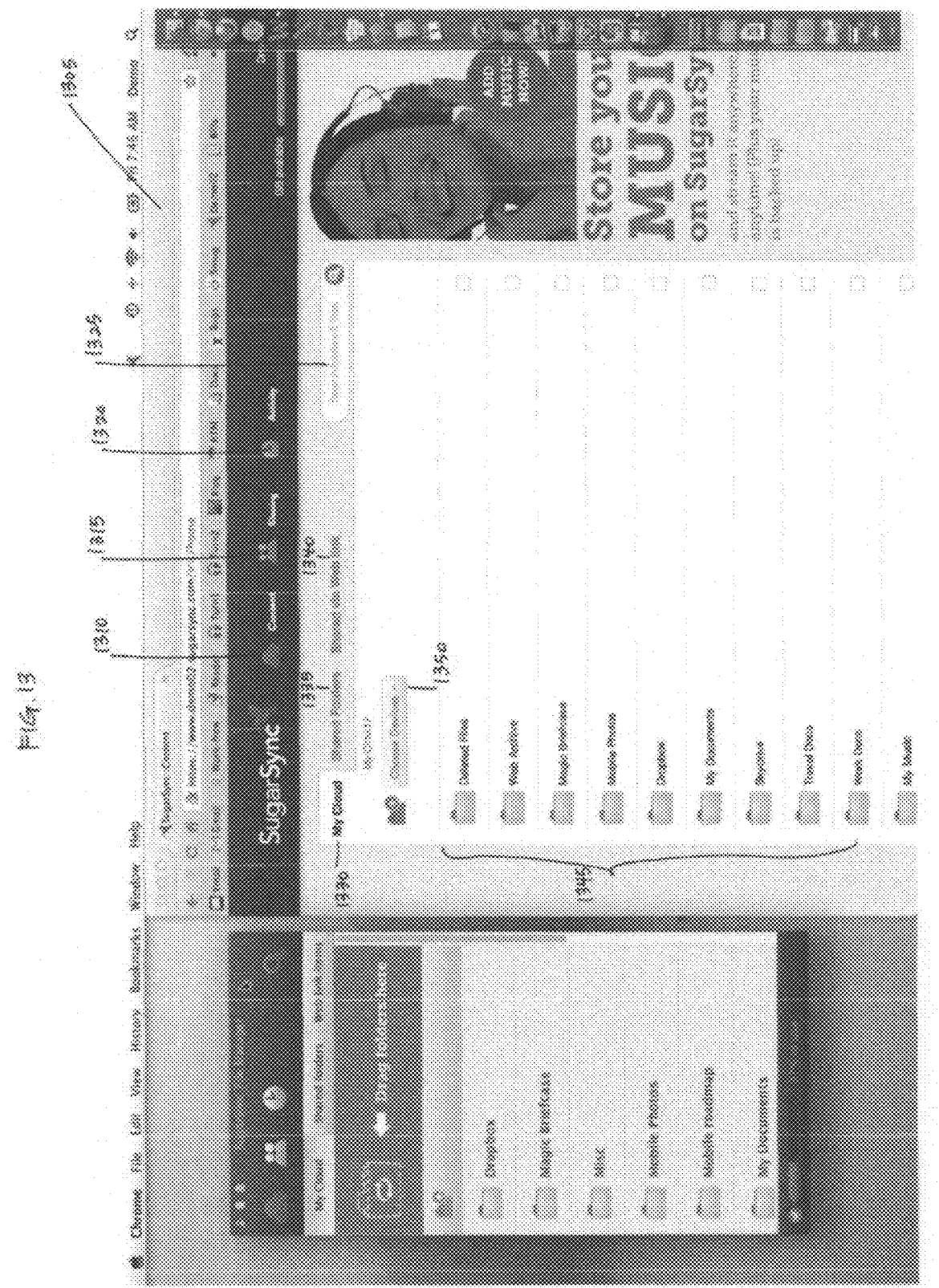
Figure 14:
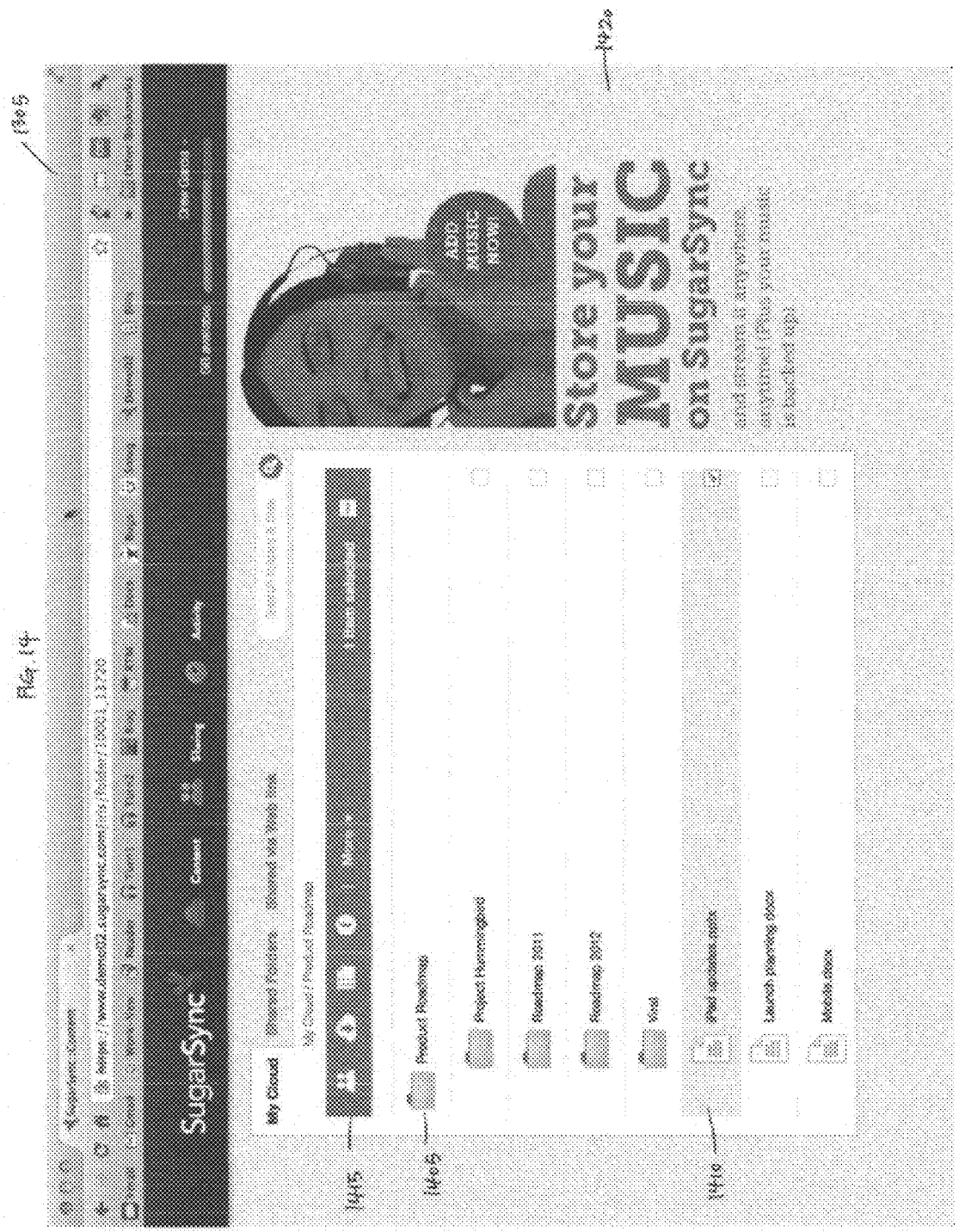

FIGS. 13-14 illustrate the corresponding web interface 1305 for the synchronization system. Similar to the user interface for the desktop client, the web interface 1305 has a content view 1310, a sharing view 1315, an activity view 1320, and a search field 1325. Within the content view 1310 the web interface 1305 has a My Cloud tab 1330, a Shared Folders tab 1335, and a Shared via Web link tab 1340. In the My Cloud tab 1330 are a list of folders 1345 from any of the synchronized client devices and a filter drop-down menu 1350 for filtering the list by client device. As seen in FIG. 14, when the user clicks on a particular folder 1405 and selects a particular folder or file 1410, a set of actions is populated in an action toolbar 1415 above. In certain embodiments, the action toolbar 1415 is tailored to the selected folder or file. In certain embodiments, additional content 1420 may be displayed on the web interface 1305 that is tailored to enhance the user's experience. For example, instructional information or help content may be provided.

Figure 15:
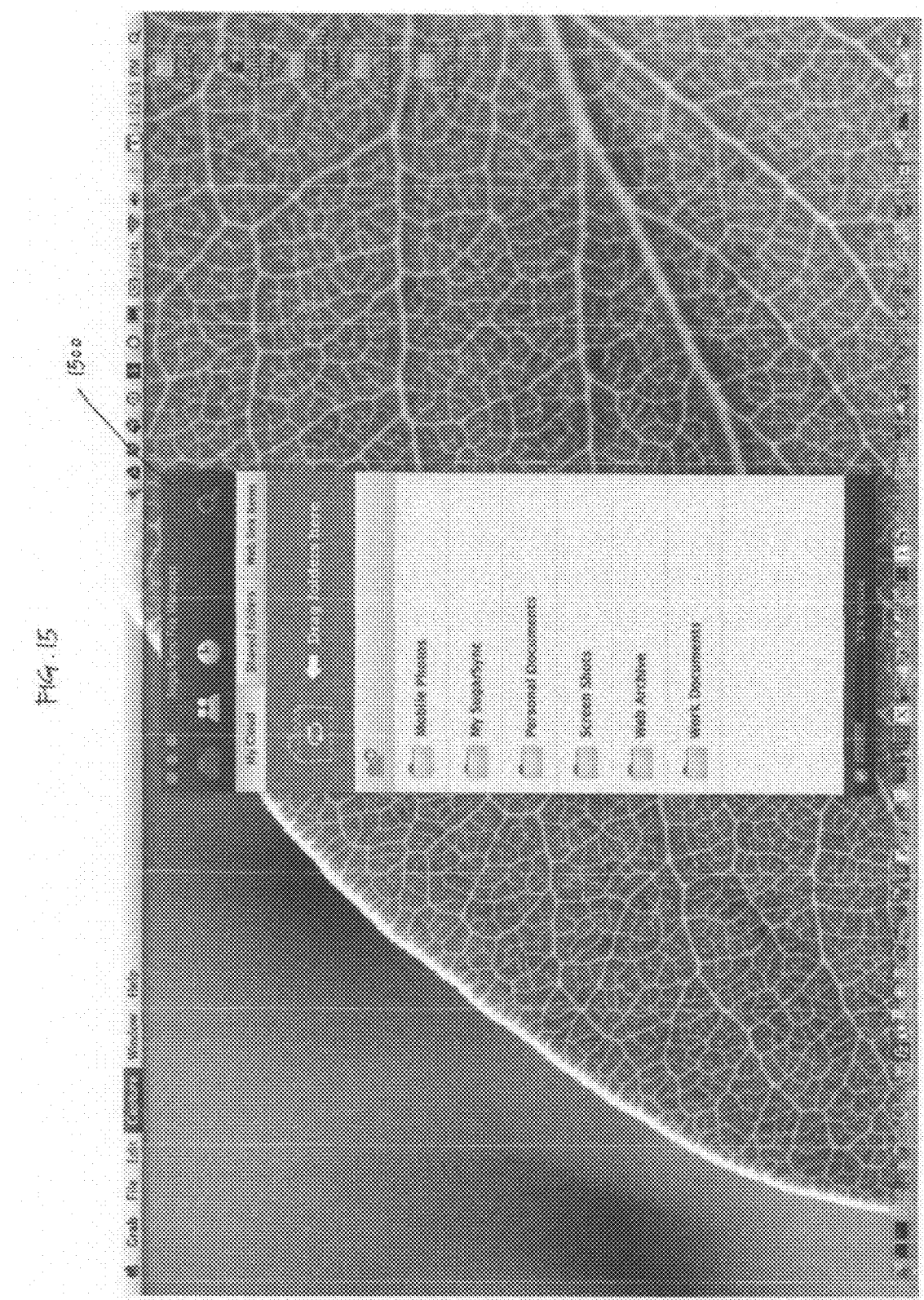
Figure 16:
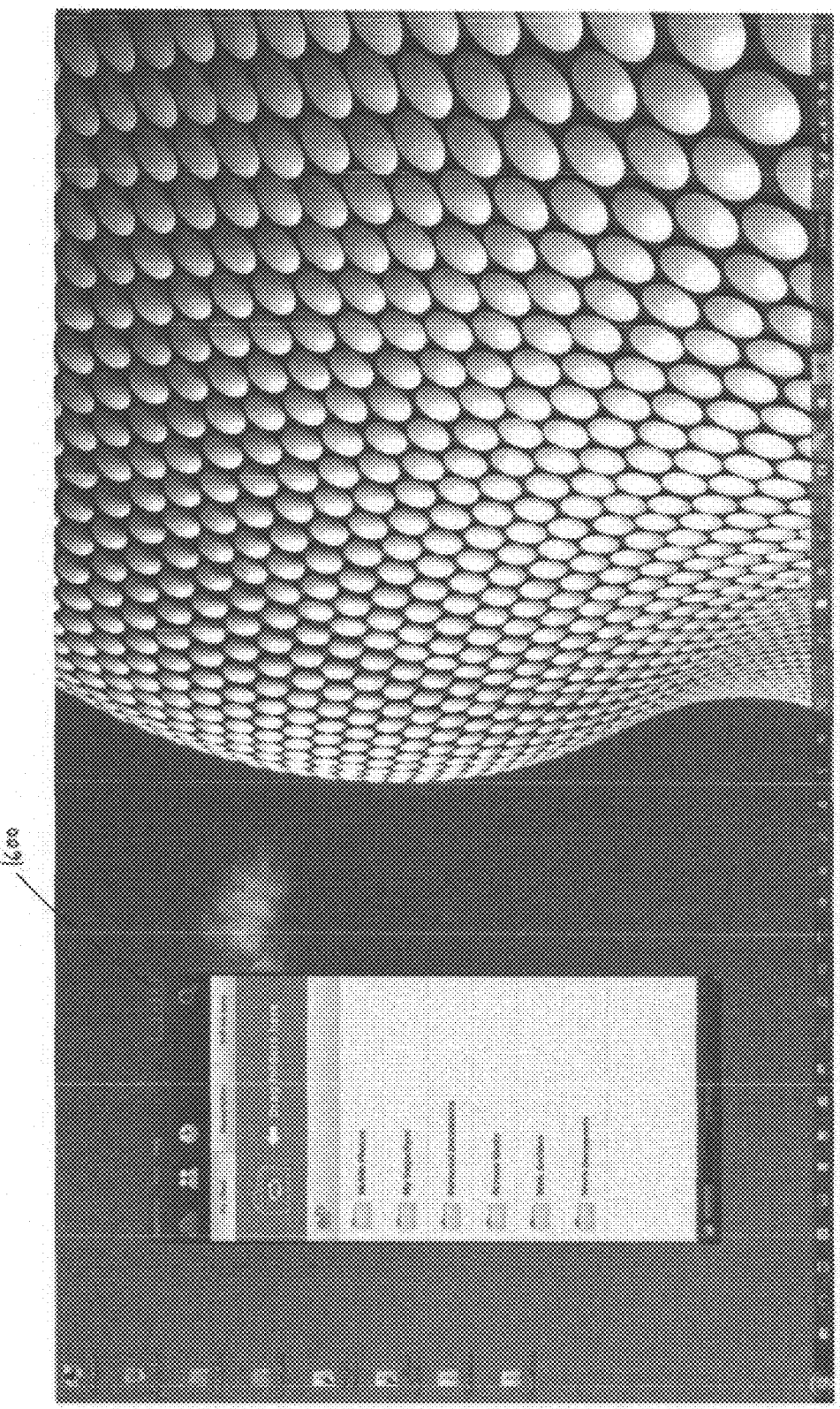
Figure 17:
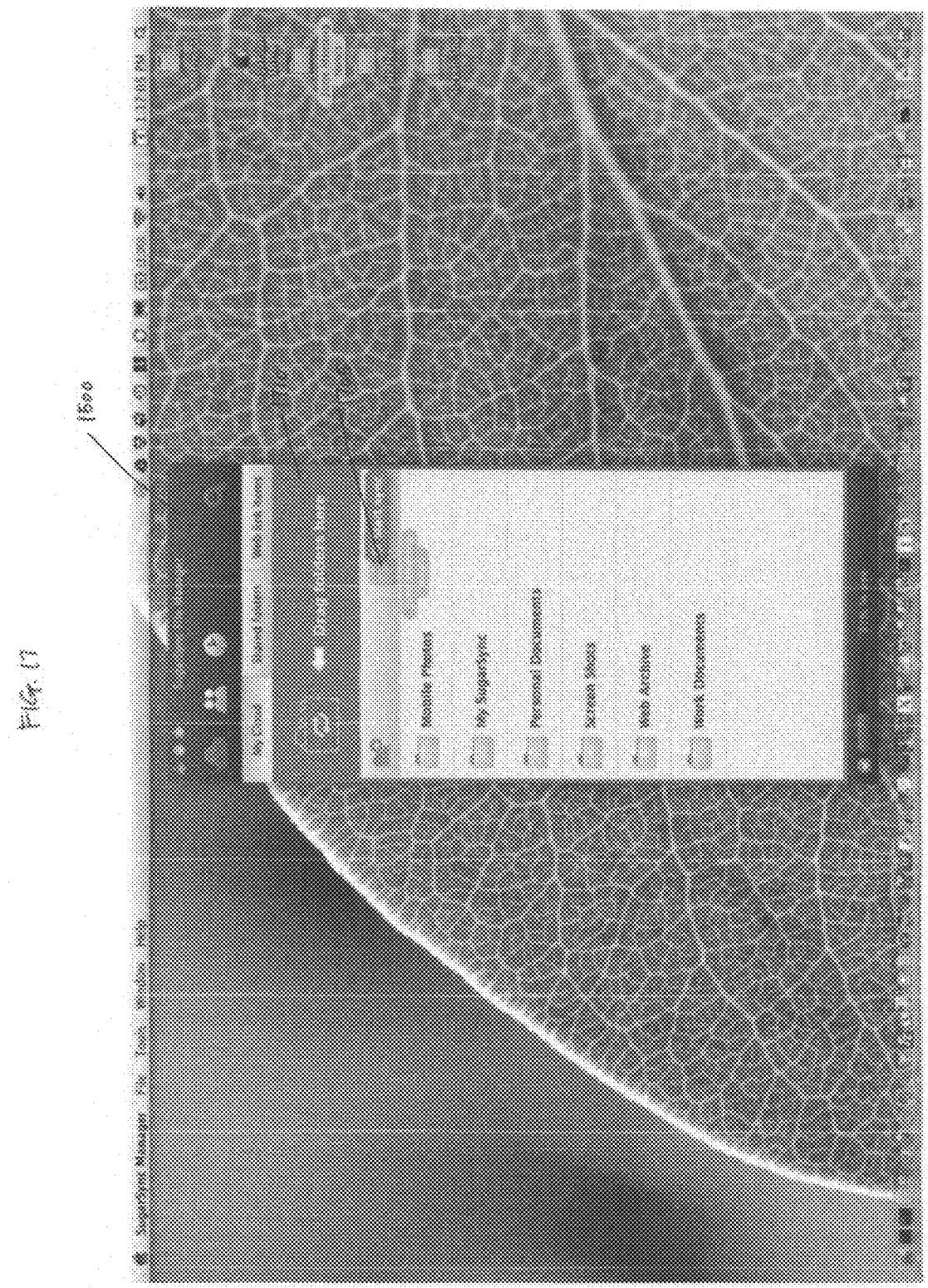

FIGS. 15-19 illustrate the process on synchronization system 200 of synchronizing a folder on a first computer to the synchronization server 220 and being able to access the folder through both the first computer and a second computer. FIG. 15 shows a user interface 1500 on the desktop of a first computer (e.g., a MACINTOSH-based desktop computer). FIG. 16 shows a user interface 1600 on the desktop of a second computer (e.g., a WINDOW-based laptop computer), which has one or more folders synchronized to the first computer. As seen in FIGS. 17-18, when the user of the first computer drags a folder labeled "June Meeting Notes" 1705 to the drop-target zone 1710 of the user interface 1500, the folder 1705 is uploaded to the synchronization server 220 and added to the list of folders 1805 of the user interface 1500 of the first computer. The folder 1705 is also added to the user interface 1600 of the second computer.

In certain embodiments, for example on a mobile client device, a dedicated view for managing photographs may be easily accessible on the user interface. In the preferred embodiment, the photographs in the photograph view are device independent and allow the user to access and share any photograph from any synchronized device. In certain embodiments, for example on the mobile client device, the contacts on the device have thumbnail pictures associated with each contact name. The thumbnail pictures may be gathered from the contact's profile on social networking sites such as TWITTER or FACEBOOK. The contacts list may also be a compilation of the synchronization system contacts and the user's mobile device contacts.

As will be understood by those familiar with the art, the invention may be embodied in other specific forms without departing from the spirit or essential characteristics thereof. Accordingly, the above disclosure of the present invention is intended to be illustrative and not limiting of the invention.

The invention claimed is:

1. A method performed on a local client device for synchronizing files and folders with a synchronization server, the method comprising:
   rendering a first view in a user interface on the local device that displays all folders, across a plurality client devices of the user, that the user has synchronized to the synchronization server, wherein folders are displayed in the first view regardless of whether the folder resides on the local device or on a remote device, and wherein the first view has:
   (i) a default mode that is device-independent, wherein in the default mode, folders are not organized by device, and
   (ii) a feature that displays the folders by which device each of the folders resides;
   rendering a first drop-target zone in the user interface that is configured to, when the user drags a chosen folder from the local device to the first drop-target zone, synchronize the chosen folder between the local device and the synchronization server, wherein, in response to the user dragging the chosen folder to the first drop-target zone:
   a copy of the chosen folder is uploaded to the synchronization server, and
   the chosen folder is added to the first view,
   wherein the first view and the first drop-target zone are rendered in a single window in the user interface;
   rendering a first section in a second view in the user interface on the local device that displays all folders, across the plurality of client devices of the user, that the user has shared with other users of the synchronization server;
   rendering a second section in the second view in the user interface on the local device that displays all folders, across the plurality of client devices of the user, that other users of the synchronization server have shared with the user;

wherein the first view and the first drop-target zone are rendered in a single window in the user interface;

in response to a specific user command with respect to a folder in the second view, rendering one or more user identifiers with whom the user has shared the folder; and rendering a third view in the user interface displaying activity related to a selected folder initially displayed in the first view, wherein for a selected folder that is shared with other users of the synchronization server, the user is able to see activity of the other users with respect to the selected folder.

2. The method of claim 1, further comprising providing a search tool in the user interface that enables the user to search for files in any folder displayed in the user interface.

3. The method of claim 1, further comprising providing a feature in the user interface that enables the user to generate a web link to any folder, or file therein, displayed in the user interface.

4. The method of claim 1, further comprising enabling the user to access, via the user interface, a virtual drive on the local device, wherein, via the virtual drive, the user is able to access files in any synchronized folder, including folders located only on a remote device.

5. The method of claim 1, further comprising enabling the user to edit synchronization settings for a remote folder via the user interface.

6. The method of claim 1, further comprising:
rendering, in response to a specified user command with respect to a selected folder in the first view, further information related to the folder, wherein the further information includes devices among the plurality of devices to which the folder is synchronized.

7. The method of claim 1, further comprising:
enabling, via the user interface, the user to synchronize a remotely-located folder on the remote device of the user to the local device of the user;
downloading, in response to the user synchronizing the remotely-located folder to the local device, a copy of the remotely-located folder to the local device;
indicating in the user interface that the remotely-located folder is synchronized to the local device; and
sharing the remotely-located folder of the user with a remotely-located device of a recipient user.

8. The method of claim 1, further comprising:
rendering a fourth view that displays a list of user contacts, wherein each listed contact provides a separate drop-target zone that is configured to, when the user drags the chosen folder to the listed contact, shares the chosen folder with the listed contact.

9. The method of claim 8, further comprising:
rendering a second drop-target zone in the user interface on which the user is able to drag a folder to generate a dialog box that provides the user with options for sharing the folder with a recipient user.

10. The method of claim 9, wherein the second drop-target zone is rendered in a window separate from the single window than the first drop-target zone is rendered in.

11. A method for providing a user interface for a synchronization system, the synchronization system comprising a plurality of client devices and a synchronization server, the method comprising:
rendering a first user interface view that displays all objects, across the plurality of client devices of the user, that the user has synchronized to the synchronization server, wherein objects are displayed in the first view regardless of whether the object resides on a local device or on a remote device, and wherein the first view has:
  (i) a default mode that is device-independent, wherein in the default mode, objects are not organized by device, and
  (ii) a feature that displays the objects by which device each of the objects resides;
rendering a first drop-target zone in the user interface that is configured to, when the user drags a chosen object to the first drop-target zone, synchronize the chosen object to the synchronization system, wherein, in response to the user dragging the chosen object to the first drop-target zone:
  a copy of the chosen object is uploaded to the synchronization system, and
  the chosen object is added to the first view;
rendering a first section in a second user interface view that displays all folders, across the plurality of client devices of the user, that the user has shared with other users of the synchronization server;
rendering a second section in the second user interface view that displays all folders, across the plurality of client devices of the user, that other users of the synchronization server have shared with the user;
wherein the first view and the first drop-target zone are rendered in a single window in the user interface;
in response to a specified user command with respect to a folder in the second view, rendering one or more user identifiers with whom the user has shared the folder; and
rendering another view in the user interface displaying activity related to a selected folder initially displayed in the first view, wherein for a selected folder that is shared with other users of the synchronization server, the user is able to see activity of the other users with respect to the selected folder.

12. The method of claim 11, wherein the objects comprise items, stored across the plurality of client devices, that share one or more specified attributes.

13. The method of claim 12, wherein the specified attributes are specified automatically by the synchronization system.

14. The method of claim 12, wherein the specified attributes are specified by the user.

15. The method of claim 14, wherein types of specified attributes available for specification by the user include:
  (i) a permission class associated with a shared object; and
  (ii) a file type associated with a file.

16. The method of claim 15, wherein the types of specified attributes available for specification by the user further include:
  a location associated with an object.

17. The method of claim 11, further comprising:
enabling, by an edit window separate from the view window, the user to edit synchronization settings for a remote object via the user interface on the local device.

18. A computer program embodied on a non-transitory computer-readable medium and comprising code, that, when executed by a computer system, enables the computer system to perform the following method for a synchronization system, the synchronization system comprising a plurality of client devices and a synchronization server, wherein the computer-readable medium comprises:
code for rendering a first view in a user interface on a local device that displays all folders, across the plurality of client devices of the user, that the user has synchronized to the synchronization server, wherein folders are displayed in the first view regardless of whether the folder resides on the local device or on a remote device, and wherein the first view has:
   (i) a default mode that is device-independent, wherein in the default mode, folders are not organized by device, and
   (ii) a feature that displays the folders by which device each of the folders resides;
code for rendering a first drop-target zone in the user interface that is configured to, when the user drags a chosen folder from the local device to the first drop-target zone, synchronize the chosen folder between the local device and the synchronization server, wherein, in response to the user dragging the chosen folder to the first drop-target zone:
   a copy of the chosen folder is uploaded to the synchronization server, and
   the chosen folder is added to the first view;
code for rendering a first section in a second view in the user interface on the local device that displays all folders, across the plurality of client devices of the user, that the user has shared with other users of the synchronization server;
code for rendering a second section in the second view in the user interface on the local device that displays all folders, across the plurality of client devices of the user, that other users of the synchronization server have shared with the user;
wherein the first view and the first drop-target zone are rendered in a single window in the user interface;
code for, in response to a specified user command with respect to a folder in the second view, rendering one or more user identifiers with whom the user has shared the folder;
code for rendering another view in the user interface displaying activity related to a selected folder initially displayed in the first view, wherein for a selected folder that is shared with other users of the synchronization server, the user is able to see activity of the other users with respect to the selected folder.

19. A computing system for providing a user interface for a synchronization system, the synchronization system comprising a plurality of client devices and a synchronization server, the computing system comprising:
   one or more processors;
   a non-transitory computer-readable medium coupled to the one or more processors, wherein the non-transitory computer-readable medium stores instructions that, when executed by the one or more processors, causes the computing system to perform the operations of:
rendering a first view in a user interface on the computing system that displays all folders, across the plurality of client devices of the user, that the user has synchronized to the synchronization server, wherein folders are displayed in the first view regardless of whether the folder resides on the computing system or on a remote device, and wherein the first view has
   (i) a default mode that is device-independent, wherein in the default mode, folders are not organized by device, and
   (ii) a feature that displays the folders by device which device each of the folders resides;
rendering a first drop-target zone in the user interface that is configured to, when the user drags a chosen folder from the computing system to the first drop-target zone, synchronize the chosen folder between the computing system and the synchronization server, wherein, in response to the user dragging the chosen folder to the first drop-target zone:
   a copy of the chosen folder is uploaded to the synchronization server, and
   the chosen folder is added to the first view;
rendering a first section in a second view in the user interface on the computing system computing system that displays all folders, across the plurality of client devices of the user, that the user has shared with other users of the synchronization server; and
rendering a second section in a second view in the user interface view on the computing system computing system that displays all folders, across the plurality of client devices of the user, that other users of the synchronization server have shared with the user;
wherein the first view and the first drop-target zone are rendered in a single window in the user interface;
in response to a specific user command with respect to a folder in the second view, rendering one or more user identifiers with whom the user has shared the folder; and
rendering another view in the user interface displaying activity related to a selected folder initially displayed in the first view, wherein for a selected folder that is shared with other users of the synchronization server, the user is able to see activity of the other users with respect to the selected folder.

* * * * *